United States Patent
Shaban et al.

(10) Patent No.: US 12,065,747 B1
(45) Date of Patent: Aug. 20, 2024

(54) METHOD OF ELECTROCATALYTIC WATER SPLITTING

(71) Applicant: King Abdulaziz University, Jeddah (SA)

(72) Inventors: Yasser A. Shaban, Jeddah (SA); Shahed U. M. Khan, Presto, PA (US); Mohamed Abdel Salam, Jeddah (SA); Radwan Khalid Al-Farawati, Jeddah (SA); Mohammed Ali Ghandourah, Jeddah (SA); Doaa Fowzi Baamer, Jeddah (SA); Mousa Zobidi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 18/609,520

(22) Filed: Mar. 19, 2024

(51) Int. Cl.
| | |
|---|---|
| *C25B 11/031* | (2021.01) |
| *C25B 1/04* | (2021.01) |
| *C25B 9/17* | (2021.01) |
| *C25B 11/061* | (2021.01) |
| *C25B 11/077* | (2021.01) |

(52) U.S. Cl.
CPC ............... *C25B 11/031* (2021.01); *C25B 1/04* (2013.01); *C25B 11/061* (2021.01); *C25B 11/077* (2021.01); *C25B 9/17* (2021.01)

(58) Field of Classification Search
None
See application file for complete search history.

(56) References Cited

FOREIGN PATENT DOCUMENTS

| CN | 107051565 A | 8/2017 |
|---|---|---|
| CN | 111889117 A | 11/2020 |
| CN | 113512731 A | 10/2021 |
| CN | 116288398 A | 6/2023 |

OTHER PUBLICATIONS

Barauskiene, I. et al; "Water-Based Electrophoretic Deposition of Ternary Cobalt-Nickel-Iron Oxides on AISI304 Stainless Steel for Oxygen Evolution" Catalysts, 2022, 12, 490. (Year: 2022).*
Bates, M. K. et al.; "Charge-Transfer Effects in Ni—Fe and Ni—Fe—Co Mixed-Metal Oxides for the Alkaline Oxygen Evolution Reaction" ACS Catalysis, 2016, 6, 155-161. (Year: 2016).*

(Continued)

*Primary Examiner* — Brian W Cohen
(74) *Attorney, Agent, or Firm* — Oblon, McClelland, Maier & Neustadt, L.L.P.

(57) ABSTRACT

A method of generating oxygen including applying a potential of from 0.1 volts (V) to 2 V to an electrochemical cell and the electrochemical cell is at least partially submerged in an aqueous solution. On application of the potential, the aqueous solution is oxidized forming the oxygen. The electrochemical cell includes a counter electrode, and an electrocatalyst. The electrocatalyst includes a copper foam substrate and a nanocomposite. The nanocomposite includes iron oxide, cobalt oxide, and nickel oxide. Furthermore, particles of the nanocomposite are distributed on a surface of the copper foam substrate and the particles of the nanocomposite have a spherical shape with an average diameter of less than 500 nanometers (nm).

17 Claims, 17 Drawing Sheets

(56) References Cited

OTHER PUBLICATIONS

Han, L. et al., "Ternary mesoporous cobalt-iron-nickel oxide efficiently catalyzing oxygen/hydrogen evolution reactions and overall water splitting" Nano Research, 2019, 12(9) 2281-2287 (Year: 2019).*

Sun et al. ; Copper foam-derived electrodes as efficient electrocatalysts for conventional and hybrid water electrolysis ; Materials Reports: Energy, vol. 2, Issue 2 ; May 2022 ; 48 Pages.

Sirisomboonchai et al. ; Developing highly efficient and durable electrocatalysts for water splitting over a wide pH range ; Hirosaki University ; 2020 ; 170 Pages.

* cited by examiner

METHOD OF ELECTROCATALYTIC WATER SPLITTING

STATEMENT OF ACKNOWLEDGEMENT

This research work was funded by Institutional Fund Projects under grant no (IFPRC-136-150-2020). Therefore, authors gratefully acknowledge technical and financial support from the Ministry of Education and King Abdulaziz University, Jeddah, Saudi Arabia.

BACKGROUND

Technical Field

The present disclosure is directed towards electrocatalysts for water-splitting systems and, more particularly, to a method for generation of oxygen.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Developing a renewable energy technology that can protect the environment and balance energy supply and demand is necessary to ensure socio-economic development. Oxygen ($O_2$) gas is considered the precursor to clean combustion and is used in a plurality of industrial processes such as, but not limited to, combustion, oxidation, flame hardening, and flame cleaning. Subsequently, hydrogen ($H_2$) has been viewed as a clean and high-density energy carrier for mitigating increasing environmental issues and global warming caused by the combustion of fossil fuels. Hydrogen is environmentally friendly, easy to convert into electricity or other forms of fuel with relatively high efficiencies and has convenient ways of storage. Currently, $H_2$ can be generated from partial oxidation, gasification, and steam reforming of hydrocarbons. However, the main drawbacks to these methods of processing are high operational costs and high temperatures and pressures, in addition to the large consumption of fossil fuels such as natural gas, which results in CO2 emissions.

Electrochemical water-splitting has been considered one of the most promising approaches for $O_2$ production and $H_2$ production. Water electrolysis consists of two half-reactions, namely anodic oxygen evolution reaction (OER) and cathodic hydrogen evolution reaction (HER). The reactions are determined by the pH of an electrolyte. In an alkaline solution, the water electrolysis pathways are shown in equations 1 and 2, as follows:

Anode: $4OH^- \rightarrow O_2 + 2H_2O + 4e^-$  1)

Cathode: $4H_2O + 4e^- \rightarrow 2H_2 + 4OH^-$  2)

In a neutral solution, the water electrolysis pathways are shown in equations 3 and 4, as follows:

Anode: $2H_2O \rightarrow O_2 + 4H^+ + 4e^-$  3)

Cathode: $4H_2O + 4e^- \rightarrow 2H_2 + 4OH^-$  4)

In an acidic solution, the water electrolysis pathways are shown in equations 5 and 6, as follows:

Anode: $2H_2O \rightarrow O_2 + 4H^+ + 4e^-$  5)

Cathode: $4H^+ + 4e^- \rightarrow 2H_2$  6)

HER is a two-electron-proton reaction, which includes two steps: firstly, adsorbing $H_2O$ (alkaline solution) or $H^+$ (acidic solution) species on the cathode to generate H* (Volmer step), and secondly, $H_2$ is generated at the cathode by electrochemical method (Heyrovsky step) or chemical method (Tafel step), which are shown in equations 7, 8, and 9, respectively:

Volmer step: $H_2O + e^- \rightarrow OH + H^*$  7)

Heyrovsky step: $H^* + H + + e^- \rightarrow H_2$  8)

Tafel step: $H^* + H^* \rightarrow H_2$  9)

The Volmer, Heyrovsky, and Tafel steps have different theoretical Tafel slopes, which are about 120 millivolts per decade (mV dec$^{-1}$), 40 m V dec$^{-1}$, and 30 mV dec$^{-1}$, respectively. Therefore, the HER mechanism can be distinguished by the Tafel slope. OER is a four-electron-transfer process with a high energy barrier. OER reactions can be described by the equations 10 and 11 under acidic or alkaline conditions, respectively:

Acidic: $2H_2O \rightarrow O_2 + 4H^+ + 4e^-$  10)

Alkaline: $4OH^- \rightarrow O_2 + 2H_2O + 4e^-$  11)

One of the hindrances to wide applications of electrocatalysis in $O_2$ production is the lack of freshwater resources. Electrolysis of seawater can avoid the consumption of freshwater resources and promote the electrolysis process in arid areas. Seawater has a high ionic conductivity of 33.9 milli-siemens per centimeter (mS·cm$^{-1}$) at 25 degrees Celsius (° C.), which is equivalent to 0.5 molar (M) sodium chloride (NaCl) solution. Therefore, there is no need to add additional acid and base to adjust its conductivity. However, the increased complexity of seawater content can cause problems in electrocatalytic seawater splitting.

Currently, noble metals and their derived materials, such as iridium oxide ($IrO_2$), ruthenium oxide ($RuO_2$), and platinum (Pt), are promising electrocatalysts for oxygen evolution reaction (OER) and hydrogen evolution reaction (HER). However, the scarce abundance of the metals above on the earth's surface and the substantial cost restrict their potential applications. Another reason for limiting its wide range of applications is the high voltage required to drive the reaction process, particularly for OER, due to its sluggish kinetics in acidic and alkaline media. Thus, developing a highly active and stable electrocatalyst based on earth-abundant elements is desirable.

Many non-noble binary and ternary transition metal/metal oxide-doped materials have recently been studied as potential catalysts for water-electrolysis, such as metal sulfides, carbides, and metal-free carbon materials. However, they show certain limitations, such as multi-step complicated synthesis procedures, the usage of hazardous organic solvents, and partially active HER and OER that restrict their potential industrial applications. Alternative electrocatalysts, such as oxides, (oxy)hydroxides, perovskite oxides, chalcogenides, and phosphates, can have high current densities at low overpotentials as well as good durability. Among them, copper (Cu) and nickel (Ni) based materials are promising candidates as functional electrocatalysts because Cu and Ni have the highest abundance in the earth's crust and are cheaper than most noble metals and some transition metals. Further, Cu and Ni have extensive redox properties with a flexible valence state $Cu^0$, $Cu^{1+}$, $Cu^{2+}$, and $Cu^{3+}$ for Cu and $Ni^{+2}$ and $Ni^{+3}$ for Ni.

Although several materials as efficient OER/HER electrocatalysts have been developed in the past, there still exists a need to develop a method for water splitting that may circumvent the drawbacks of the prior art. It is one object of the present to make an electrocatalyst for generating oxygen in an environmentally friendly manner.

SUMMARY

In an exemplary embodiment, a method of generating oxygen is disclosed. The method includes applying a potential of from 0.1 volts (V) to 2 V to an electrochemical cell and the electrochemical cell is at least partially submerged in an aqueous solution. On application of the potential, the aqueous solution is oxidized forming the oxygen. The electrochemical cell includes a counter electrode, and an electrocatalyst. The electrocatalyst includes a copper foam substrate and a nanocomposite. The nanocomposite includes iron oxide, cobalt oxide, and nickel oxide. Furthermore, particles of the nanocomposite are distributed on a surface of the copper foam substrate and the particles of the nanocomposite have a spherical shape with an average diameter of less than 500 nanometers (nm).

In some embodiments, the particles of the nanocomposite are aggregated forming aggregates with an average size of 500 nm to 5 micrometers (μm).

In some embodiments, the copper foam has an average pore size of 500 nm to 1 μm.

In some embodiments, the particles of the nanocomposite form a continuous layer on the copper foam substrate.

In some embodiments, the electrocatalyst comprises 0.1 atomic percentage (at. %) to 1 at. % Fe, 0.1 at. % to 2 at. % Co, 1 at. % to 5 at. % Ni, 60 at. % to 70 at. % Cu, and 25 at. % to 35 at. % O, based on a total number of atoms in the electrocatalyst.

In another exemplary embodiment, a process of making the electrocatalyst is described. The process includes mixing an iron salt, a nickel salt, and a cobalt salt to form a mixture and performing spray pyrolysis with the mixture onto the copper foam substrate. The spray pyrolysis is performed 1 to 10 times for a period of 1 second to 30 seconds each with an oxygen carrier gas.

In some embodiments, the copper foam substrate has a temperature of 300 degrees Celsius (° C.) to 500° C. during the spray pyrolysis.

In some embodiments, the mixture includes a molar ratio of the iron salt to nickel salt to cobalt salt of 1-10 to 1-10 to 1-10.

In yet another exemplary embodiment, the counter electrode includes a nickel-iron foam substrate and carbon doped titanium oxide. The particles of the carbon doped titanium oxide are distributed on a surface of the nickel-iron foam substrate.

In some embodiments, the particles of the carbon doped titanium oxide have a nanoflake shape.

In some embodiments, the counter electrode includes 25 at. % to 35 at. % Ti, 50 at. % to 60 at. % O, 5 at. % to 10 at. % C, 1 at. % to 5 at. % Fe, and 1 at. % to 10 at. % Ni, based on a total number of atoms in the counter electrode.

In some embodiments, in the particles of the carbon doped titanium oxide a portion of lattice oxygens are replaced with carbon and/or a portion of titanium atoms are replaced with carbon.

In some embodiments, the counter electrode has a Tafel slope of 85 millivolts per decade (mV/dec) to 95 mV/dec.

In some embodiments, the aqueous solution is seawater.

In some embodiments, the aqueous solution is buffered seawater.

In some embodiments, the electrocatalyst has a Tafel slope of 70 m V/dec to 80 m V/dec.

In some embodiments, the electrochemical cell has an overpotential of 330 m V to 360 mV to reach 50 milliampere per square centimeter ($mA/cm^2$).

In yet another exemplary embodiment, the electrochemical cell has at a current density of 190 $mA/cm^2$ to 210 $mA/cm^2$ at the potential of 1.2 V, and the aqueous solution is buffered seawater.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
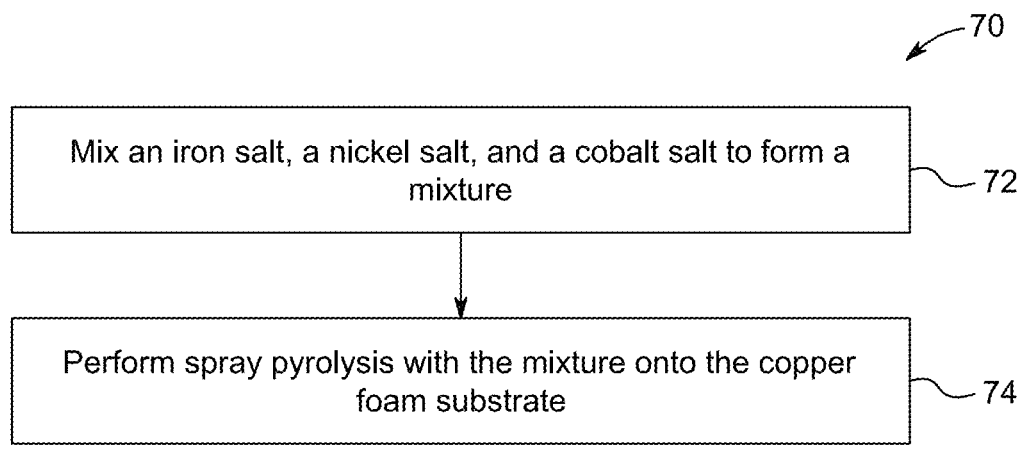
FIG. 1 depicts a method flowchart for making an electrocatalyst, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

Where a numerical limit or range is stated herein, the endpoints are included. Also, all values and subranges within a numerical limit or range are specifically included as if explicitly written out.

As used herein, "particle size" and "pore size" may be thought of as the lengths or longest dimensions of a particle and of a pore opening, respectively.

As used herein, the term "electrode" refers to an electrical conductor used to contact a non-metallic part of a circuit e.g., a semiconductor, an electrolyte, a vacuum, or air.

As used herein, the term "current density" refers to the amount of electric current traveling per unit cross-section area.

As used herein, the term "Tafel slope" refers to the relationship between the overpotential and the logarithmic current density.

As used herein, the term "electrochemical cell" refers to a device capable of either generating electrical energy from chemical reactions or using electrical energy to cause chemical reactions.

As used herein, the term "water splitting" refers to the chemical reaction in which water is broken down into oxygen and hydrogen.

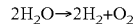

$$2H_2O \rightarrow 2H_2 + O_2$$

As used herein, the term "overpotential" "refers to the difference in potential that exists between a thermodynamically determined reduction potential of a half-reaction and the potential at which the redox event is experimentally observed. The term is directly associated with a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of naturally occurring nickel $^{28}$Ni include $^{58}$Ni, $^{60}$Ni, $^{61}$Ni, $^{62}$Ni, and $^{64}$Ni. Isotopes of iron include $^{54}$Fe, $^{56}$Fe, $^{57}$Fe, and $^{58}$Fe. Isotopes of oxygen include $^{16}$O, $^{17}$O, and $^{18}$O isotopically labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to a method for generating oxygen through water splitting using electrodes synthesized by spray pyrolysis. An electrochemical cell includes an electrocatalyst containing earth abundant metal oxides of Fe, Co, and Ni oxides a working electrode (anode) for OER, and optionally includes a carbon-doped titanium dioxide (TiO$_2$) as a counter electrode (cathode) for HER. The results indicate that the electrochemical cell configuration demonstrated excellent electrocatalytic activity at low current density.

A method of water splitting is described. A method of generating oxygen and hydrogen gas is described. The method includes applying a potential from 0.1-2 volts (V), preferably 0.2-1.9 V, preferably 0.3-1.8 V, preferably 0.4-1.7 V, preferably 0.5-1.6 V, preferably 0.6-1.5 V, preferably 0.7-1.4 V, preferably 0.8-1.3 V, preferably 0.9-1.2 V, and preferably 1.0-1.1 V to an electrochemical cell. The electrochemical cell includes an electrocatalyst (anode) and a counter electrode (cathode). Herein, the anode is where OER occurs and the cathode is where HER occurs, following the applying the potential in the water splitting reaction. The electrochemical cell is at least partially submerged in an aqueous solution, preferably 50%, 60%, 70%, 80%, 90%, or fully submerged.

The electrocatalyst for the OER electrode includes a copper foam substrate, and a nanocomposite. In some embodiments, the copper foam substrate could be replaced with copper in a form of a sheet or foil. Herein, the foam is used because metal foams with a three-dimensional open-pore structure have a high specific surface area and structural rigidity, and thus are suitable self-supported substrates on which active materials can be in situ grown or coated. In some embodiments, the copper foam has an average pore size of 500 nm-1 µm, preferably 550-950 nm, preferably 600-900 nm, preferably 650-850, preferably 700-800 nm. In some embodiments, the pores have a circular, rectangular, or square shape.

The nanocomposite includes a ternary composite of iron oxide, cobalt oxide, and nickel oxide. The particles of the nanocomposite may have many shapes, such as cones, cuboidal, pyramidical, cylindrical, wires, crystals, rectangles, triangles, pentagons, hexagons, prisms, disks, cubes, ribbons, blocks, beads, discs, barrels, granules, whiskers, flakes, foils, powders, boxes, stars, flowers, etc., and mixtures thereof. In a specific embodiment, the particles of the nanocomposite have a spherical shape with an average diameter of less than 500 nm, preferably 100-450 nm, 150-400 nm, 200-350 nm, or about 250-300 nm.

The particles of the nanocomposite are aggregated forming aggregates with an average size of 500 nanometers (nm) (0.5 micrometers (µm))-5 µm, preferably 1000 nm-4.5 µm, preferably 1.5-4.0 µm, preferably 2.0-3.5 µm, and preferably 2.5-3.0 µm. In some embodiments, the particles of the nanocomposite are distributed on the surface of the copper foam substrate. The nanocomposite particles form a continuous layer on the copper foam substrate. In other words, there are no islands of the nanocomposite rather they are continuously connected over the surface. The nanocomposite particles cover at least 50%, preferably 55%, preferably 60%, preferably 65%, preferably 70%, preferably 75%, preferably 80%, preferably 85%, preferably 90%, and preferably >95% of the copper foam substrate.

In some embodiments, the electrocatalyst, with the substrate and the nanocomposite, includes 0.1-1 atomic percent (at. %), preferably 0.2-0.9 at. %, preferably 0.3-0.8 at. %, preferably 0.4-0.7 at. %, and preferably 0.5-0.6 at. % Fe; 0.1-2 at. %, preferably 0.2-1.9 at. %, preferably 0.3-1.8 at. %, preferably 0.4-1.7 at. %, preferably 0.5-1.6 at. %, preferably 0.6-1.5 at. %, preferably 0.7-1.4 at. %, preferably 0.8-1.3 at. %, preferably 0.9-1.2 at. %, and preferably 1.0-1.1 at. % Co; 1-5 at. %, preferably 1.5-4.5 at. %, preferably 2.0-4.0 at. %, and preferably 2.5-3.5 at. % Ni; 60-70 at. %, preferably 61-69 at. %, preferably 62-68 at. %, preferably 63-67 at. %, and preferably 64-66 at. % Cu; and 25-35 at. %, preferably 26-34 at. %, preferably 27-33 at. %, preferably 28-32 at. %, and preferably 29-31 at. % O, based on the total number of atoms in the electrocatalyst. In a specific embodiment, the electrocatalyst includes 0.42 at. % Fe, 0.91 at. % Co, 2.15 at. % Ni, 66.17 at. % Cu, and 30.35 at. % O, based on the total number of atoms in the electrocatalyst. In some embodiments, the nanocomposite includes at least one of Fe(II) and Fe(III), at least one of Co(II) and Co(III) and at least one of Ni(0), Ni(II), and Ni(IV).

FIG. 1 illustrates a flow chart of a method 70 of a method of making the electrocatalyst. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes mixing an iron salt, a nickel salt, and a cobalt salt to form a mixture. The mixing may be carried out manually or with the help of a stirrer. Suitable examples of iron salts include iron bromide, iron chloride, iron phosphate hydrate, iron phosphate tetrahydrate, iron chloride hydrate, iron chloride tetrahydrate, iron fluoride, ammonium iron sulfate hexahydrate, iron citrate tribasic monohydrate, iron gluconate dehydrate, iron pyrophosphate, iron phthalocyanine, iron phthalocyanine chloride, ammonium iron citrate, ammonium iron sulfate, ammonium iron sulfate, ammonium iron sulfate dodecahydrate, iron chloride, iron bromide, iron chloride hexahydrate, ferric citrate, iron fluoride, iron nitrate nonahydrate, iron oxide, iron phosphate, iron sulfate hydrate, iron gluconate hydrate, iron iodide, iron lactate hydrate, iron oxalate dehydrate, ferrous sulfate heptahydrate, iron sulfide, iron acetate, iron fluoride tetrahydrate, iron iodide tetrahydrate, iron perchlorate hydrate, iron acetylacetonate, iron acetylacetonate, and iron ascorbate and/or its hydrate. Suitable examples of nickel salt include nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or its hydrate. Suitable examples of cobalt salts include cobalt chloride, chloropentahammine cobalt chloride, hexaammine cobalt chloride, cobalt phosphate, cobalt phosphate, ammonium cobalt sulfate, diammonium tetra nitrate cobalt, cobalt acetate, cobalt formate, cobalt tetraoxide, cobalt bromide, cobalt oxalate, cobalt selenate, cobalt tungstate, cobalt molybdate, cobalt iodide, and cobalt phosphate or its hydrate. In a specific embodiment, the iron salt is ammonium ferric sulfate dodecahydrate [(NH$_4$)Fe(SO$_4$)$_2$·12H$_2$O]. In a specific embodiment, the nickel salt is nickel chloride (NiCl$_2$). In a specific embodiment, the cobalt salt is cobalt nitrate hexa-hydrate [Co(NO$_3$)$_2$·6H$_2$O]. In some embodiments, the mixture includes a molar ratio of the iron salt to nickel salt to cobalt salt of 1-10:1-10:1-10. In a specific embodiment, the mixture includes a molar ratio of the iron salt to nickel salt to cobalt salt of 1:4:2. In a preferred embodiment, the resulting nanocomposite has a same molar ratio as what is in the mixture.

At step 74, the method 70 includes performing spray pyrolysis with the mixture onto the copper foam substrate. The spray pyrolysis is performed 1-10 times, preferably 2-9 times, preferably 3-8 times, preferably 4-7 times, preferably 5-6 times for a period of 1-30 seconds, preferably 3-28 seconds, preferably 5-26 seconds, preferably 7-24 seconds, preferably 9-22 seconds, preferably 11-19 seconds, preferably 13-16 seconds each with an oxygen carrier gas. The spray pyrolysis operation is carried out using a specially designed spray gun. In some embodiments, the copper foam substrate has a temperature of 300-500° C., preferably 310-490° C., preferably 320-480° C., preferably 330-470° C., preferably 340-460° C., preferably 350-450° C., preferably 360-440° C., preferably 370-430° C., preferably 380-420° C., and preferably 390-410° C., during the spray pyrolysis. In a specific embodiment, the copper foam substrate has a temperature of 400° C. during the spray pyrolysis.

In some embodiments, the counter electrode may contain an electrically-conductive material such as platinum, platinum-iridium alloy, iridium, titanium, titanium alloy, stainless steel, gold, cobalt alloy, and/or some other electrically-conductive material, where an "electrically-conductive material" as defined here is a substance with an electrical resistivity of at most $10^{-6}$ ohms meter ($\Omega \cdot m$), preferably at most $10^{-7}$ $\Omega \cdot m$, more preferably at most $10^{-8}$ $\Omega \cdot m$ at a temperature of 20-25° C. The form of the counter electrode may be generally relevant only in that it needs to supply sufficient current to the electrolyte solution to support the current required for the electrochemical reaction of interest. In one embodiment, the counter electrode may be a wire, a rod, a cylinder, a tube, a scroll, a sheet, a piece of foil, a woven mesh, a perforated sheet, or a brush. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or lead to undesirable contamination of either electrode. In some embodiments, the counter electrode is a platinum electrode.

In some embodiments, the counter electrode includes particles of titanium dioxide ($TiO_2$) distributed on a nickel-iron foam (NFF) substrate. In some embodiments, the $TiO_2$ particles may be optionally doped with carbon to obtain carbon-doped titanium oxide (C—$TiO_2$). A portion of lattice oxygens and/or a portion of titanium atoms are replaced with carbon to prepare the C—$TiO_2$. In some embodiments, 1-20% of the Ti atoms are replaced with carbon, preferably 2-18%, 4-16%, 6-14%, 8-12% or about 10%, based on a total number of Ti atoms in the C—$TiO_2$. The particles may exist in various morphological shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc. and mixtures thereof. In a specific embodiment, the particles of the C—$TiO_2$ have a nanoflake shape. In some embodiments, the nanoflakes have an average width of 1-10 μm, preferably 2-9 μm, 3-8 μm, 4-7 μm, or 5-6 μm and an average length of 1-10 μm, preferably 2-9 μm, 3-8 μm, 4-7 μm, or 5-6 μm. In some embodiments, the nanoflakes are aggregated on the NFF surface, forming a continuous structure.

In some embodiments, the counter electrode, with the NFF substrate and the C—$TiO_2$ includes 25-35 at. % Ti, preferably 26-34 at. %, preferably 27-33 at. %, preferably 28-32 at. %, and preferably 29-31 at. % Ti, 50-60 at. % O, preferably 51-59 at. %, preferably 52-58 at. %, preferably 53-57 at. %, preferably 54-56 at. % O, 5-10 at. % C, preferably 6-9 at. %, preferably 7-8 at. % C, 1-5 at. % Fe, preferably 1.5-4.5 at. %, preferably 2.0-4.0 at. %, and preferably 2.5-3.5 at. % Fe, and 1-10 at. % Ni, preferably 2-9 at. %, preferably 3-8 at. %, preferably 4-7 at. %, preferably 5-6 at. % Ni based on the total number of atoms in the counter electrode.

In some embodiments, the aqueous solution includes water that may be tap water, distilled water, bidistilled water, deionized water, deionized distilled water, reverse osmosis water, and/or some other water. In a preferred embodiment, the water is seawater, which prevents the necessity of freshwater usage. Preferably the seawater has a salinity of 0.1-10 wt. %, preferably 1-9 wt. %, 2-8 wt. %, 3-7 wt. %, or about 4-6 wt. %, based on a total weight of the seawater. In a most preferred embodiment, the seawater is buffered seawater. The buffer can be any suitable buffer system including but not limited to a sodium borate buffer, a tri-citrate buffer, and a phosphate buffer. In a preferred embodiment, the seawater has a pH of 8-10, or about 8.5. The buffer is added to prevent precipitation of salts on the electrodes and corrosion.

The counter electrode including the NFF substrate and the C—$TiO_2$ has a Tafel slope of 85-95 millivolt/decade (m V $dec^{-1}$), preferably 86-94 m V $dec^{-1}$, preferably 87-93 m V $dec^{-1}$, preferably 88-92 m V $dec^{-1}$, preferably 89-91 m V $dec^{-1}$. In a specific embodiment, the counter electrode has a Tafel slope of 90 mV $dec^{-1}$. The electrocatalyst has a Tafel slope of 70-80 mV $dec^{-1}$, preferably 71-79 m V $dec^{-1}$, preferably 72-78 m V $dec^{-1}$, preferably 73-77 mV $dec^{-1}$, and preferably 74-76 m V $dec^{-1}$. In a specific embodiment, the electrocatalyst has a Tafel slope of 76 mV $dec^{-1}$.

In some embodiments, the electrochemical cell has an overpotential of 330-360 mV, 335-365 mV, 340-360 mV, and 345-355 mV to reach 50 mA/$cm^2$. In some embodiments, the electrochemical cell has a current density of 190-210 mA/$cm^2$, 192-208 mA/$cm^2$, 194-206 mA/$cm^2$, 196-204 mA/$cm^2$, and 198-202 mA/$cm^2$, at the potential of 1.2 V when the aqueous solution is buffered seawater.

While not wishing to be bound to a single theory, it is thought that the unique morphology and properties of the ternary nanocomposite including Fe along with Co and Ni generates active mixed oxide surfaces having lower overpotential for OER. Also, in synergistic combination with the C—$TiO_2$ counter electrode having a large surface area, which can support more surface-active sites, enhancing the ion transport rate in HER. This results in a system that facilitates the charge transferability process from the bulk to the surface region through increasing its conductivity and maintaining its long-term stability in terms of overall water splitting.

In one embodiment, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be RHE, a standard hydrogen electrode (SHE), a normal hydrogen electrode (NHE), a saturated calomel electrode (SCE), a Cu—Cu(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, the reference electrode is Ag/AgCl.

In some embodiments, the electrocatalyst may also be used in the field of batteries, fuel cells, photochemical cells, water splitting cells, electronics, water purification, hydrogen sensors, semiconductors (such as field-effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis.

EXAMPLES

The following details of the examples demonstrate a method for water splitting as described herein. The examples are provided solely for illustration and are not to be construed as limitations of the present disclosure, as many variations thereof are possible without departing from the spirit and scope of the present disclosure.

Example 1: Synthesis of Ni, Co, and Fe Oxides and their Ternary Mixed Oxide on Cu Foam Copper foam (CF) substrates (Cu foam, American Elements, 3 mm thickness, 99.9% purity) were cut to an area of 1.0×1.0 cm$^2$. The foam substrates were then cleaned in a sonicator for thirty-minute intervals with acetone and double de-ionized water in a 1:1 ratio and double de-ionized water. The cleaned foam substrates were dried at 60 degrees Celsius (° C.) for three hours. Typically, aqueous solutions of 0.05 molar (M) ammonium ferric sulfate dodecahydrate $(NH_4)Fe(SO_4)_2 \cdot 12\ H_2O$, 0.1 M cobalt nitrate hexahydrate $Co(NO_3)_2 \cdot 6H_2O$, and 0.2 M nickel chloride ($NiCl_2$) were prepared and used as spray solutions to synthesize iron (Fe), cobalt (Co) and nickel (Ni) individual oxides denoted as Fe@CF, Co@CF, Ni@CF, and Fe—Co—Ni@CF, respectively. Note that, to synthesize the mixed Fe—Co—Ni oxide, the spray solution was prepared by dissolving the molar ratio of 1:2:4 of the above-mentioned Fe, Co, and Ni salts, respectively, in solution. The spray pyrolysis operation was carried out for a total of 30 seconds, having three 10-second spray periods on CF substrate at a temperature of 400° C. using a specially designed spray gun and oxygen ($O_2$) as the carrier gas with a pressure of 20 pounds per square inch (psi). Between each spray period, there were intervals of around 10 minutes for the substrate temperature to be raised back to 400° C. on the hot plate. After complete cooling and synthesis of Ni, Co, and Fe oxides and their ternary mixed oxide on Cu foam, a non-conductive resin-based epoxy was applied to the backside and top part of the front side of the CF substrate.

Example 2: Synthesis of $TiO_2$ and C—$TiO_2$ on Ni—Fe Foam

Nickel-iron foam (NFF) substrates (Ni—Fe foam, American Elements, 0.5 mm thickness, 99.9% purity) were cut to an area of 1.0×1.0 cm$^2$. The NFF substrates were then cleaned and dried as described in Example 1. In a typical synthesis procedure, a mixture of aqueous solutions of 0.2 M titanium butoxide and 0.1 weight percentage (wt. %) glycine, as a source of carbon, was prepared and used as a spray solution to synthesize carbon-doped titanium oxide (C—$TiO_2$) on NFF, denoted as C—$TiO_2$@NFF. The spray pyrolysis operation was carried out for a total of 30 seconds, with three 10-second spray periods on the NFF substrate at a temperature of 450° C., using oxygen as the carrier gas with a pressure of 20 psi. Between each spray period there were intervals of around 10 min for the substrate temperature to be raised back to 450° C. on the hot plate. A similar procedure was applied to fabricate $TiO_2$ on NFF ($TiO_2$@NFF) without adding glycine. After complete cooling, a non-conductive resin-based epoxy was applied to the backside and top part of the front side of the NFF substrate.

Example 3: Electrochemical Measurement Techniques

Linear sweep voltammetry (LSV) was used as the primary tool to assess the electrocatalytic performance of the electrodes towards oxygen evolution reaction (OER) and hydrogen evolution reaction (HER). A three-electrode configuration in a single-compartment cell was used. Silver (Ag) or silver chloride (AgCl) was used as a reference electrode in each single-compartment electrochemical cell. Four different electrochemical cell systems were used. First, Fe, Co, and Ni oxides and their ternary mixed oxides on CF substrate (Fe@CF, Co@CF, Ni@CF, and Fe—Co—Ni@CF) as working electrodes (anodes) and platinum as a counter electrode (cathode). Second, C—$TiO_2$ on NFF (C—$TiO_2$@NFF) is used as a working electrode (anode), and platinum is used as a counter electrode (cathode). Third, $TiO_2$@@NFF is used as a working electrode (anode), and Pt is used as a counter electrode (cathode). Fourth, an electrochemical cell configuration was by assembling Fe—Co—Ni@CF as a working electrode (anode) for OER, and C—$TiO_2$@NFF replaced the traditional platinum as a counter electrode (cathode) for HER.

1 M potassium hydroxide (KOH), natural seawater, and buffered natural seawater were used as electrolyte solutions. Sodium borate buffer was used to prepare the buffered natural seawater to maintain the pH of seawater to around 8.5. The linear sweep curves of the catalysts were obtained using a scanning potentiostat (Metrohm, Autolab PGSTAT302N). A slow scanning speed of 5 millivolts per second (mV/s) was adopted to minimize the extra resistances developed at the electrode-solution interfaces by the bubbles of oxygen and hydrogen gases generated during water-splitting reactions and to be closer to steady-state conditions.

Example 4: Electrode Characterization Techniques

The surface morphology and elemental composition of the electrodes were investigated by scanning electron microscope (SEM) (A JSM-7600F, JEOL, USA) with an energy dispersive X-ray spectroscopic (EDS) unit (X-Max 50 mm$^2$, Oxford Instruments). The ionic state and surface composition of the catalysts were analyzed by X-ray photoelectron spectroscopy (XPS) (Escalab Xi+, Thermo Scientific) with an Al-Kα (1253.6 eV) X-ray source. The X-ray beam size was 650 micrometers (μm), and survey spectra were recorded with pass energy (PE) of 20 electron volts (eV), step size 1 eV.

Example 5: Electrode Characterization

Figure 2A:
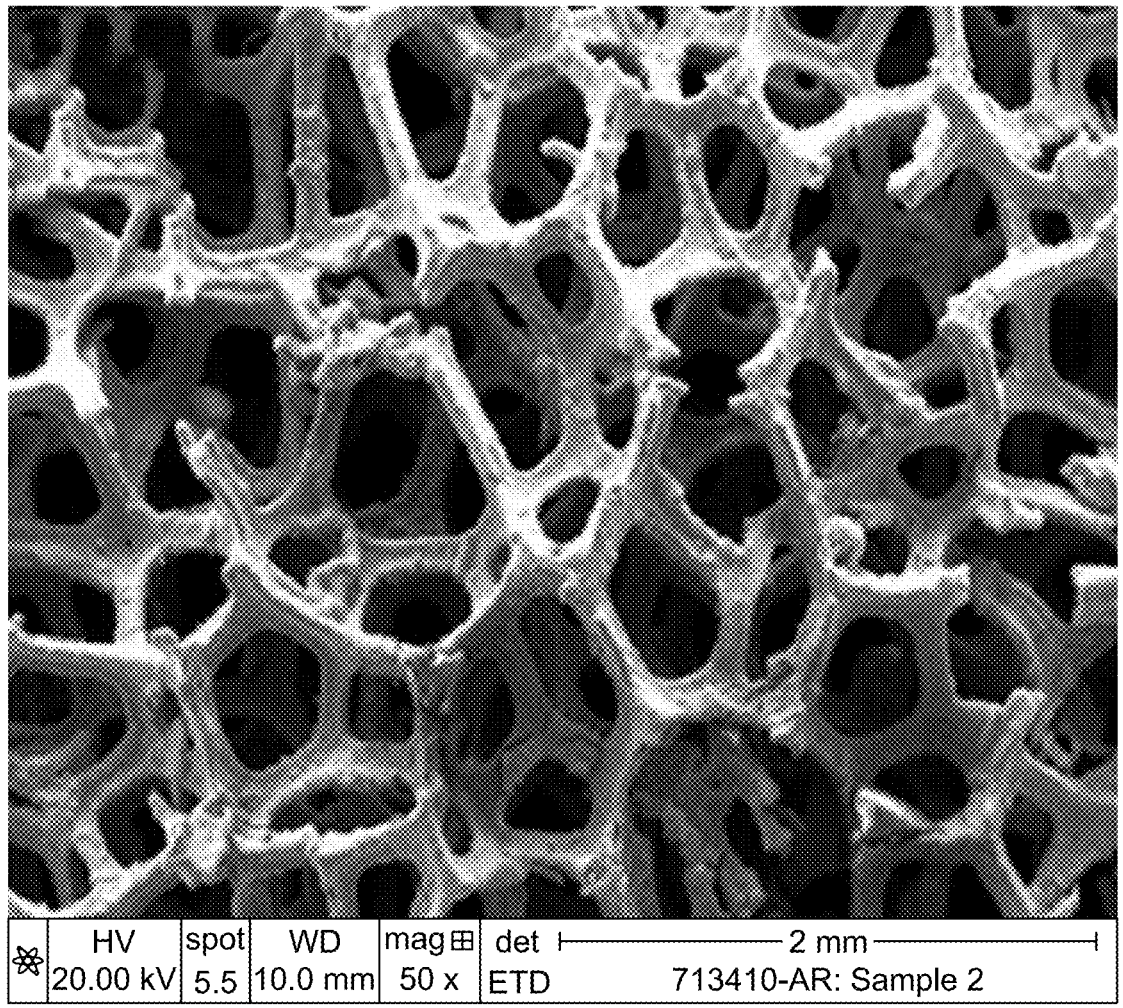
FIG. 2A depicts a scanning electron microscopy (SEM) image of a ternary mixed oxide of Fe, Co and Ni, on a three-dimensional (3D) open-pore structure Cu foam, (CF), (denoted as Fe—Co—Ni@CF) electrode at 50× magnification, according to certain embodiments.
Figure 2B:
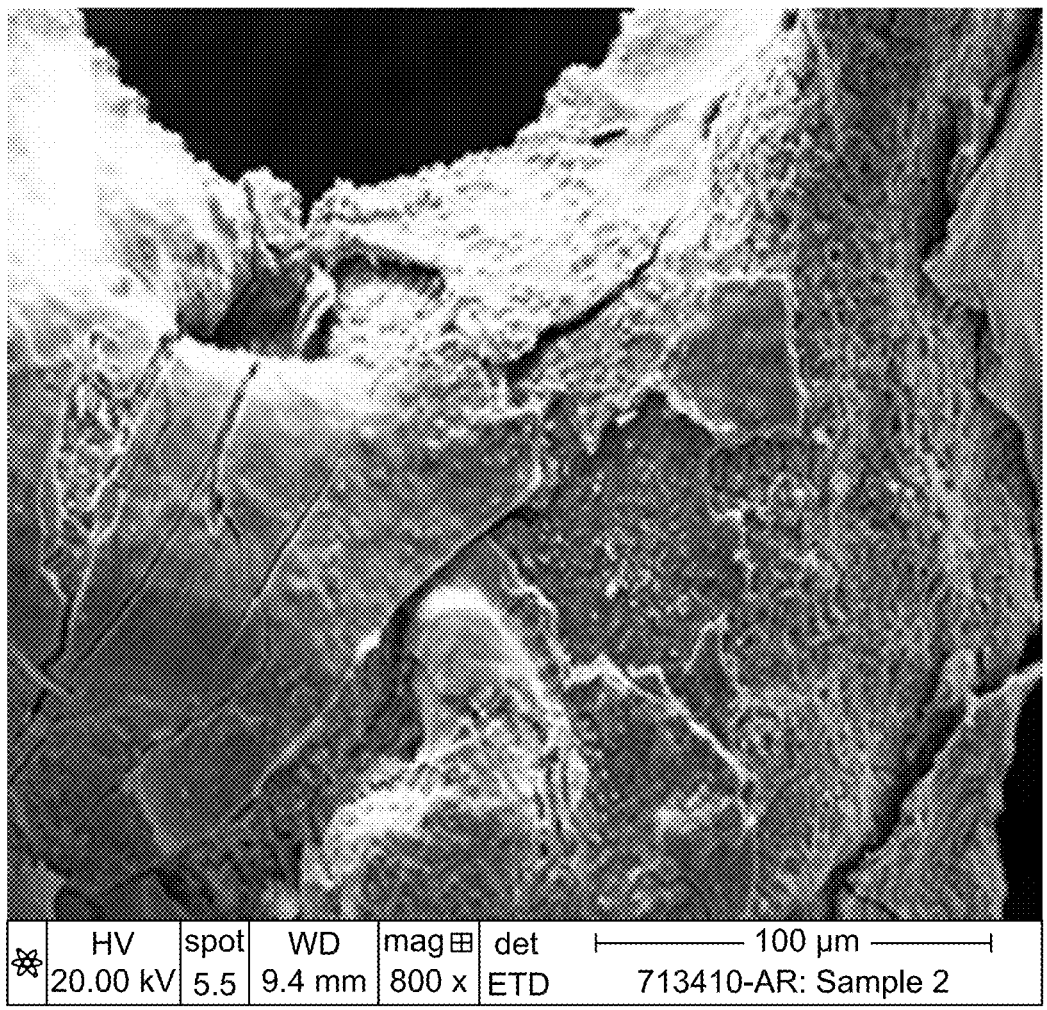
FIG. 2B depicts a SEM image of the Fe—Co—Ni@CF electrode at 800× magnification, according to certain embodiments.
Figure 2C:
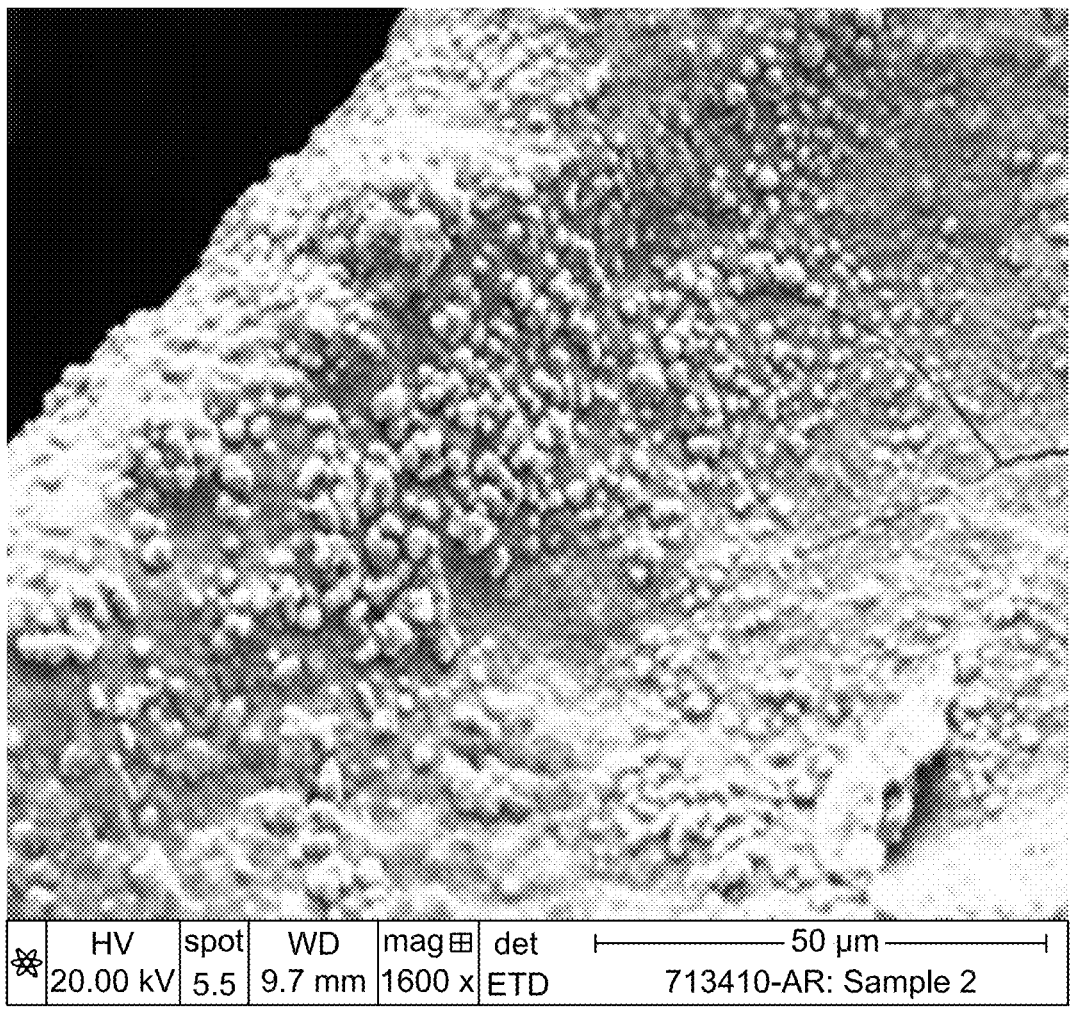
FIG. 2C depicts a SEM image of the Fe—Co—Ni@CF electrode at 1600× magnification, according to certain embodiments.
Figure 2D:
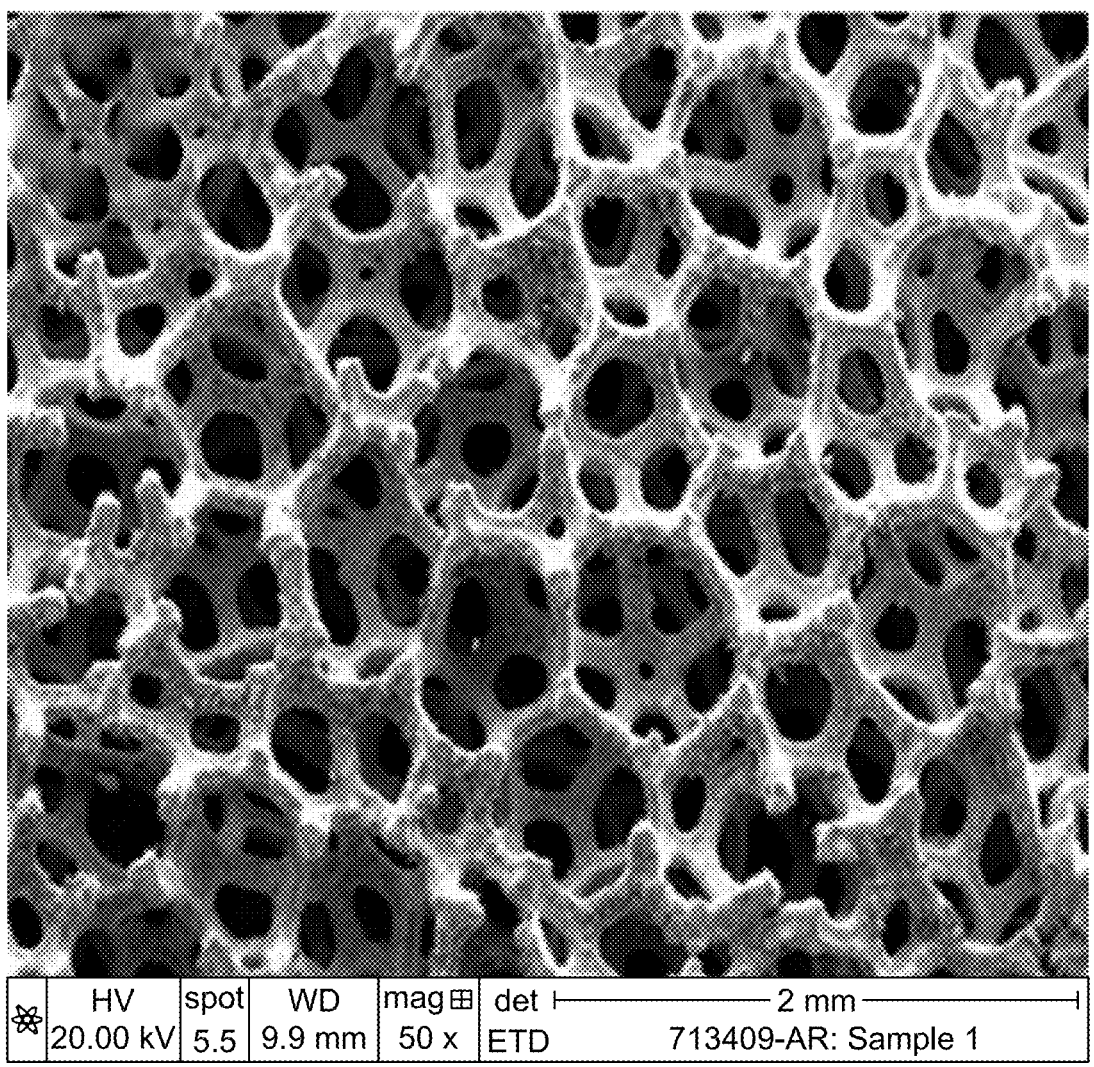
FIG. 2D depicts a SEM image of a carbon-doped titanium oxide ($C—TiO_2$) on a 3D open-pore structure Ni—Fe foam (NFF) (denoted as $C—TiO_2$@NFF) electrode, at 50× magnification, according to certain embodiments.
Figure 2E:
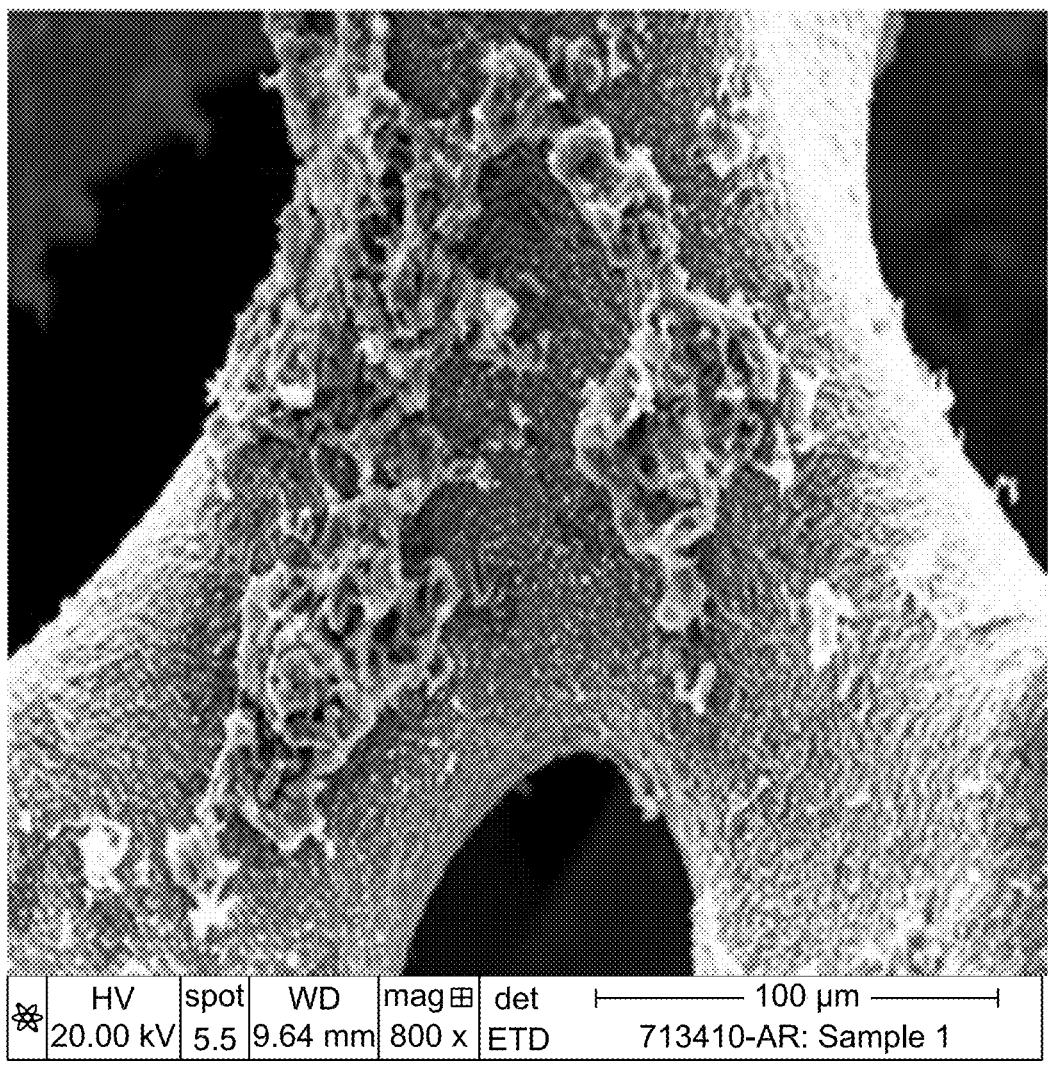
FIG. 2E depicts a SEM image of the $C—TiO_2$@NFF electrode at 800× magnification, according to certain embodiments.
Figure 2F:
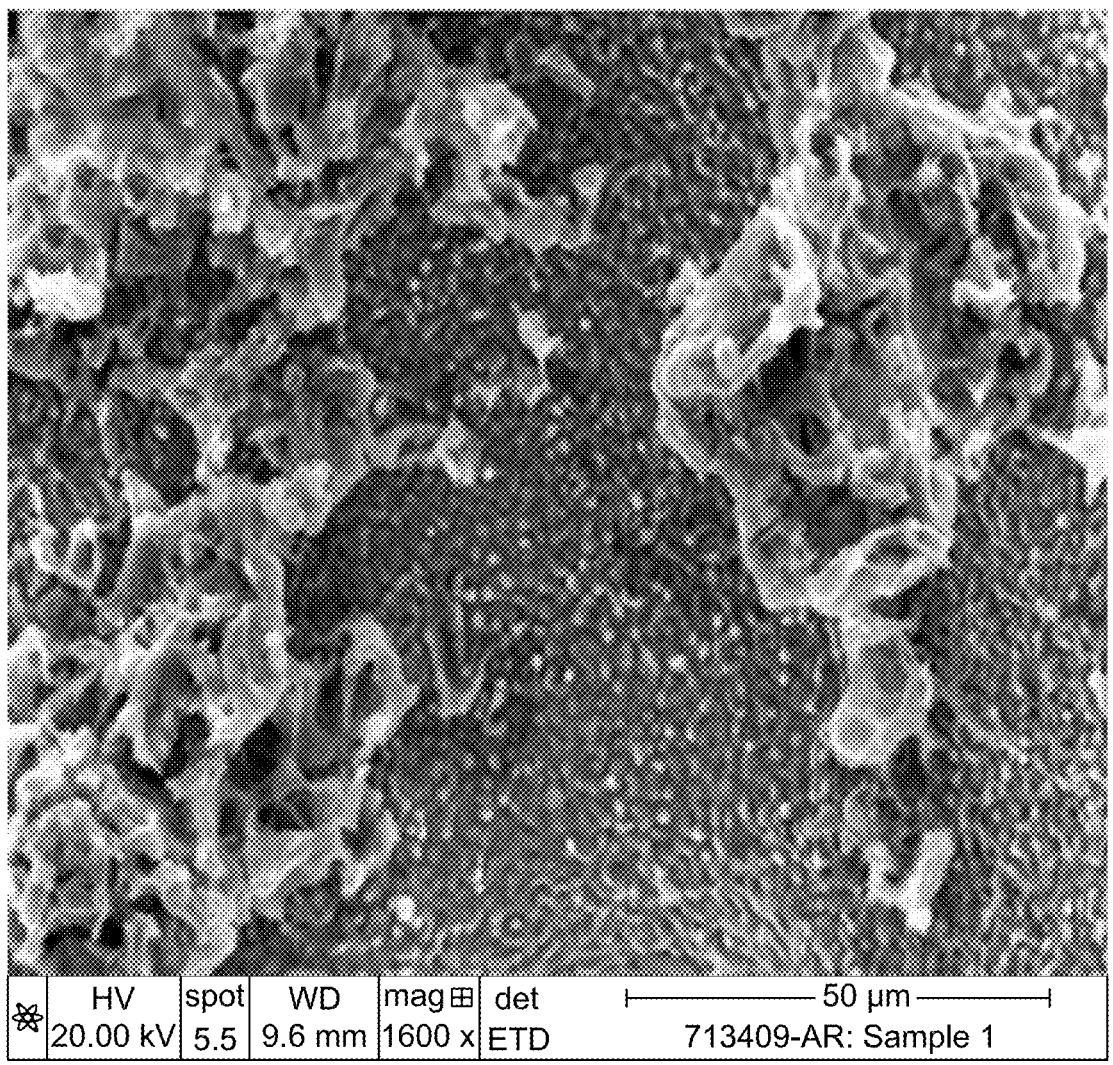
FIG. 2F depicts a SEM image of the $C—TiO_2$@NFF electrode at 1600× magnification, according to certain embodiments.

For surface characterization evaluation, the surface morphologies of Fe—Co—Ni@CF and C—$TiO_2$@NFF were investigated by scanning electron microscopy, as depicted in FIGS. 2A-2F. At low-magnification SEM images, the porous Cu foam (CF) and nickel-iron foam (NFF) are densely and homogeneously covered by Fe—Co—Ni, as shown in FIG. 2A, and C—$TiO_2$, as shown in FIG. 2D, respectively. As can be seen from FIG. 2B and FIG. 2C, at higher magnification of Fe—Co—Ni@CF, the surface skeleton of the CF becomes rough with some decorated nanoparticles on the surface, which can be attributed to the aggregation of Ni—Fe—Co. Further, as can be seen from FIG. 2E and FIG. 2F, the higher magnification images of C—$TiO_2$@NFF show nanoflake-shaped particles with large surface area, which can support more surface-active sites, enhancing the ion transport rate during the HER.

Figure 3A:
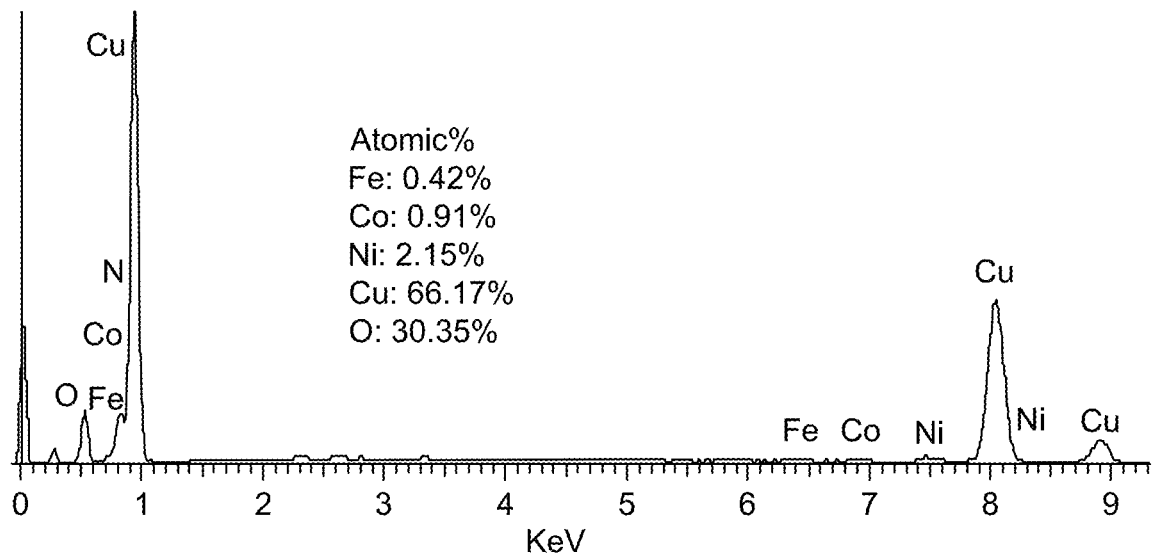
FIG. 3A depicts an energy dispersive X-ray spectroscopy (EDS) image of the Fe—Co—Ni@CF electrode, according to certain embodiments.
Figure 3B:
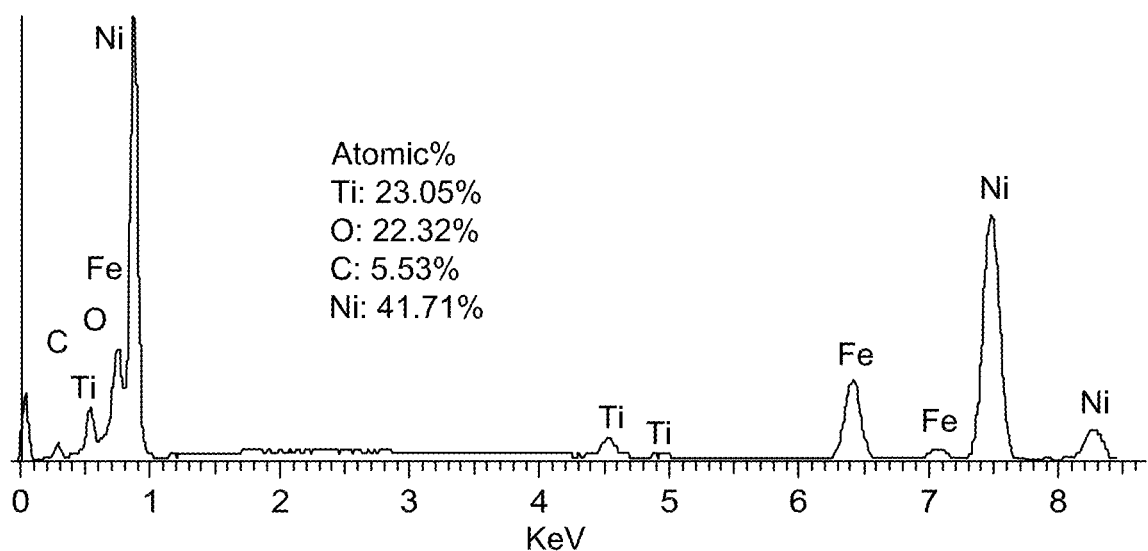
FIG. 3B depicts an EDS image of the $C—TiO_2$@NFF electrode, according to certain embodiments.

EDS was employed to study the surface elemental analysis of the catalysts. FIGS. 3A-3B depicts the EDS spectra of Fe—Co—Ni@CF and C—$TiO_2$@NFF. The EDS data for Fe—Co—Ni@CF confirmed the existence of Ni, Co, Fe, Cu, and O (FIG. 3A). Meanwhile, it is clear that the atomic weight percentage of 0.42% for Fe, 0.91% for Co, and 2.15% for Ni tends to be consistent, in randomly selected point. The ratio of these elements in the spray solution indicates that the Fe, Co, and Ni elements of Fe—Co—Ni@CF are uniformly distributed throughout the catalyst. Further, the mole atomic ratio of Fe, Co, and Ni is approximately 1:2:4 within experimental error.

On the other hand, FIG. 2B depicts the EDS spectra of C—$TiO_2$@NFF, showing well-defined peaks for Ti, O, C, Ni, and Fe. The presence of 5.53 atomic % of carbon reveals the successful incorporation of carbon into the C—$TiO_2$ lattice. Three possible theoretical scenarios can be proposed to incorporate C atoms into the $TiO_2$ lattice. Firstly, the substitution of lattice oxygen with carbon; secondly, the replacement of Ti atoms by C atoms; and lastly, the stabilization of carbon at an interstitial position.

Figure 4A:
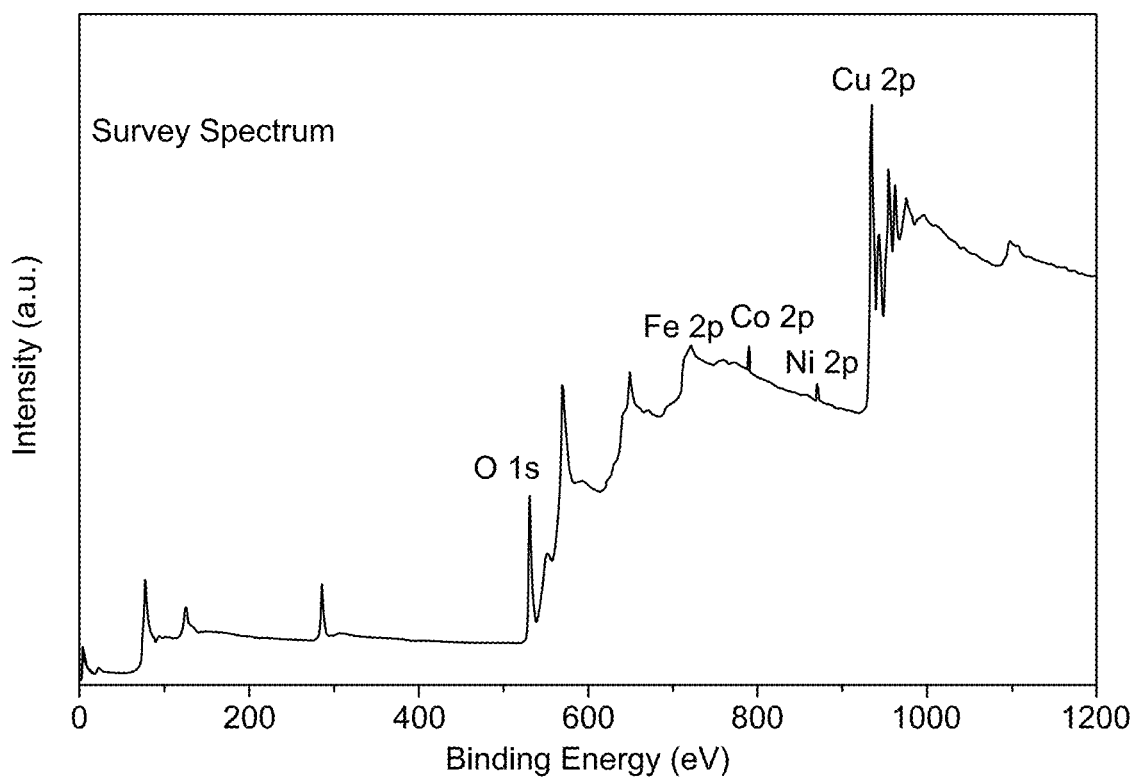
FIG. 4A shows an X-ray photoelectron spectroscopy (XPS) survey spectrum of the Fe—Co—Ni@CF electrode, according to certain embodiments.
Figure 4B:
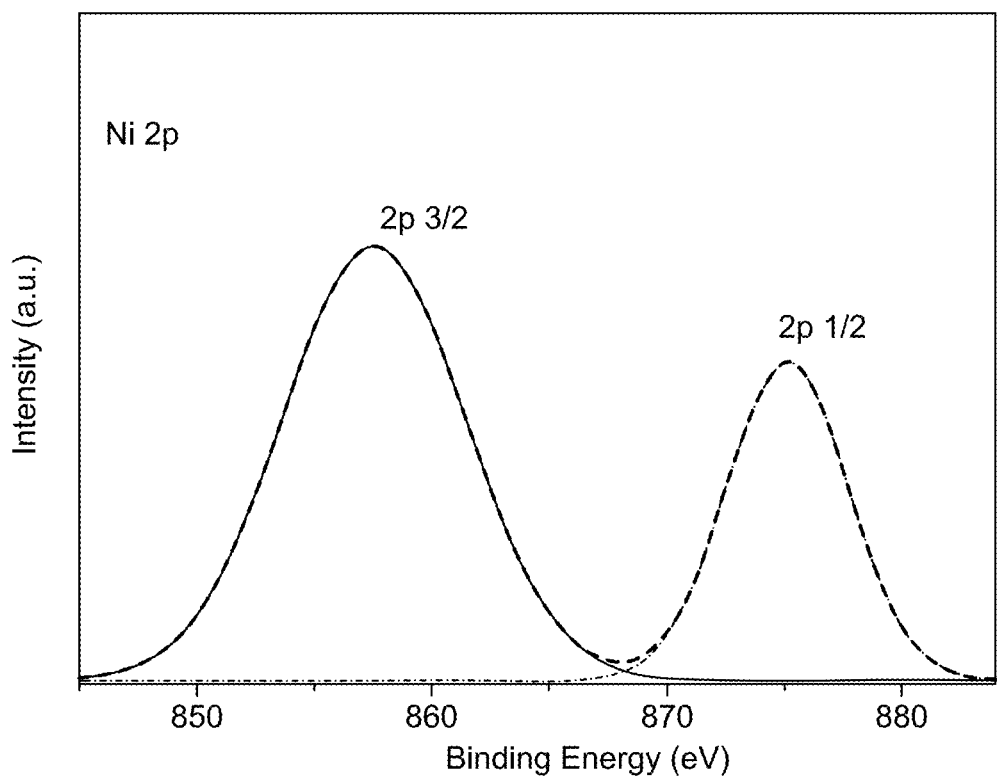
FIG. 4B shows an XPS graph for Ni 2p of the Fe—Co—Ni@CF electrode, according to certain embodiments.
Figure 4C:
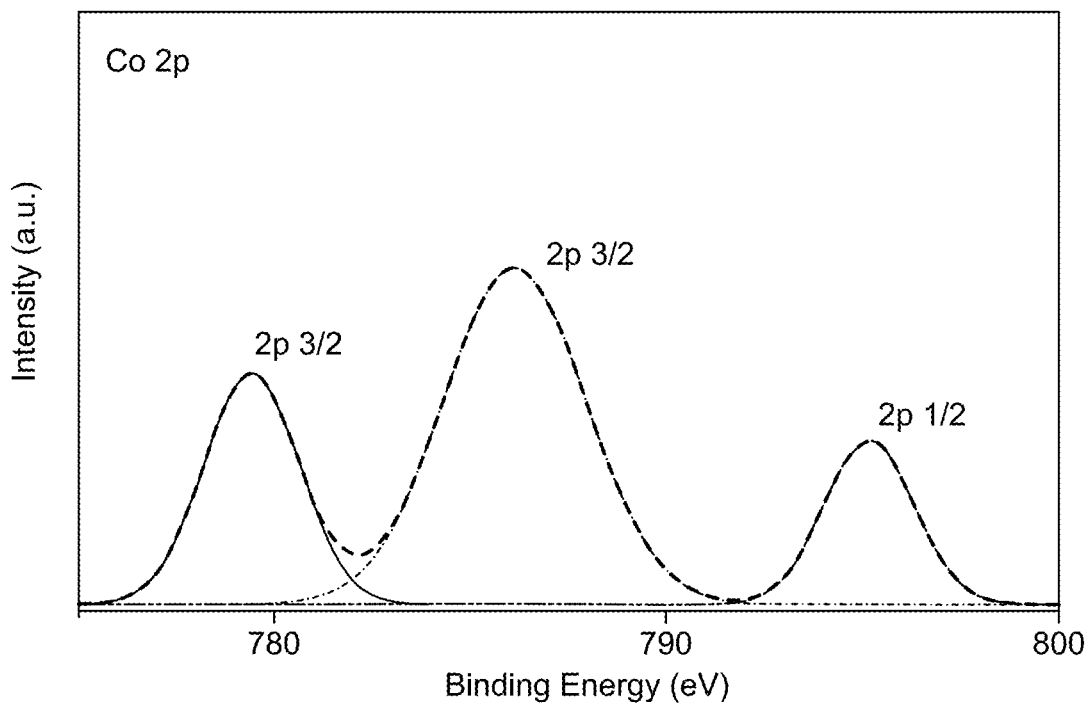
FIG. 4C shows an XPS graph for Co 2p of the Fe—Co—Ni@CF electrode, according to certain embodiments.
Figure 4D:
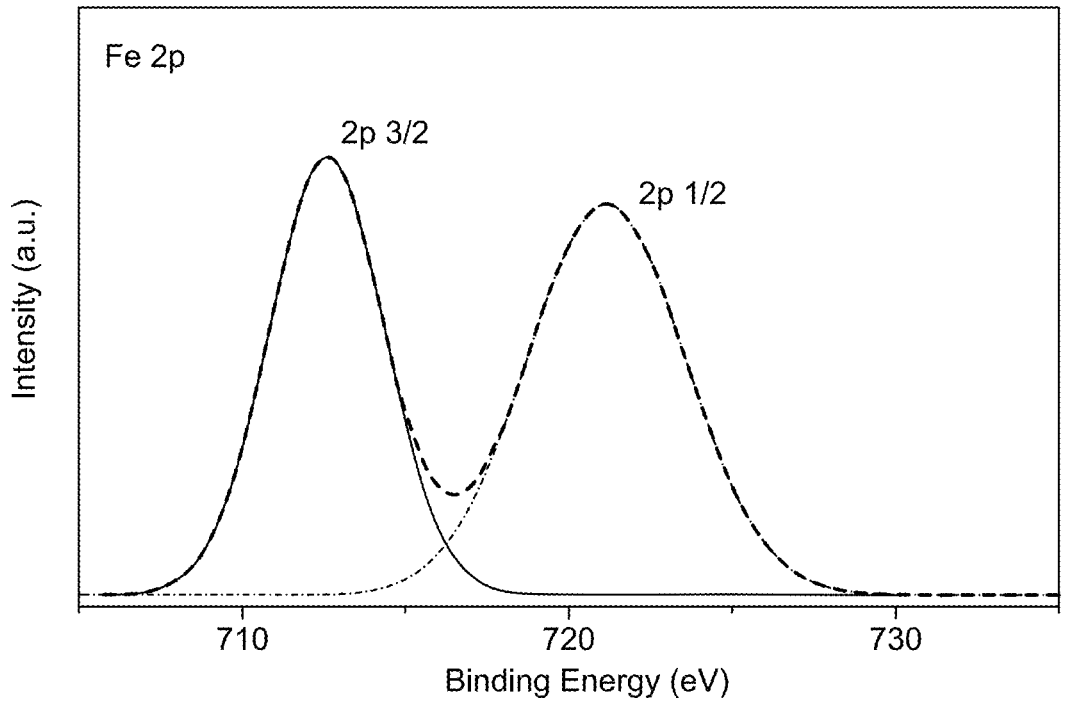
FIG. 4D shows an XPS graph for Fe 2p of the Fe—Co—Ni@CF electrode, according to certain embodiments.
Figure 4E:
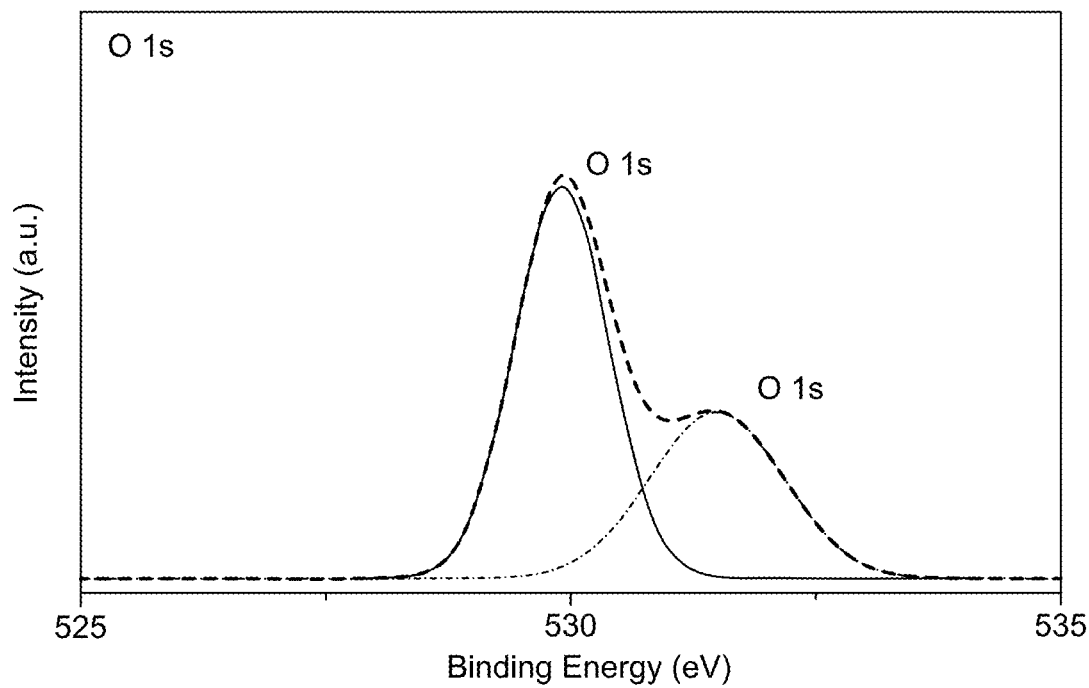
FIG. 4E shows an XPS graph for O 1 s of the Fe—Co—Ni@CF electrode, according to certain embodiments.
Figure 4F:
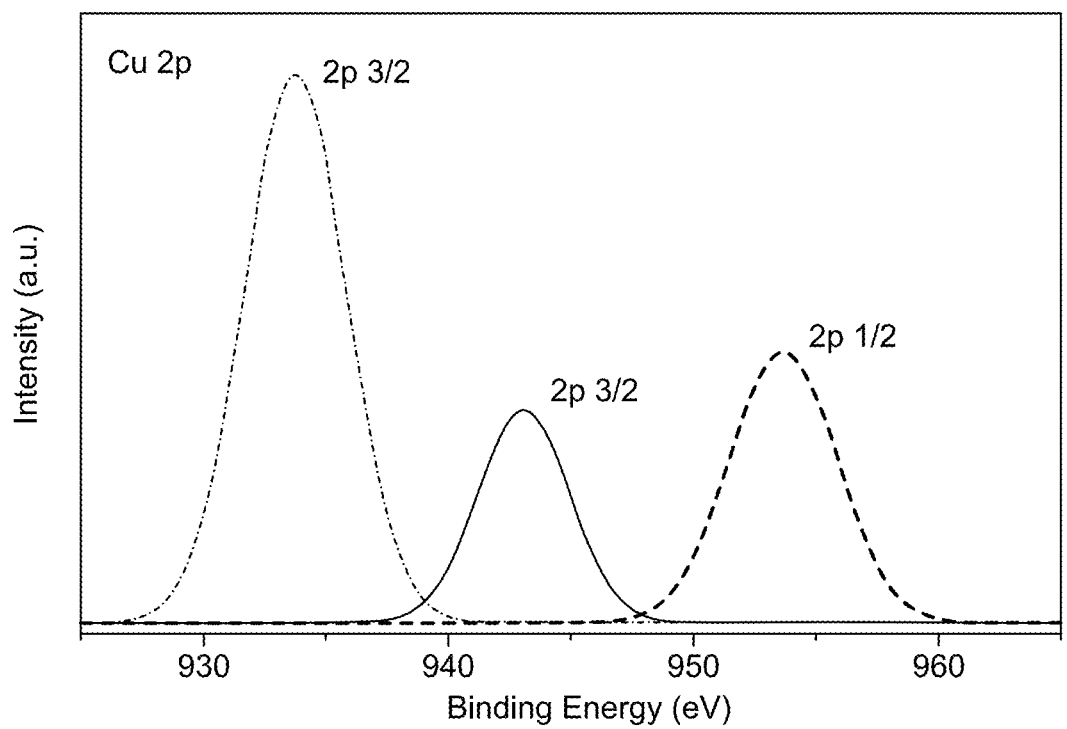
FIG. 4F shows an XPS graph for Cu 2p of Fe—Co—Ni@CF, according to certain embodiments.

XPS was employed to study the ionic state and the surface composition of the catalysts. The XPS survey spectrum of Fe—Co—Ni@CF, as depicted in FIG. 4A, confirmed the characteristics of a specific Ni 2p, Co 2p, Fe 2p, Cu 2p and O 1s. FIG. 4B depicts the spectrum of Ni 2p, showing two peaks at 857.1 eV and 857.4 eV assigned for Ni $2p_{3/2}$ and Ni $2p_{1/2}$, respectively. FIG. 4C depicts the XPS spectrum of Co 2p, showing three peaks at 779.5 eV and 786.1 eV for Co $2p_{3/2}$ and 795.1 eV for Co $2p_{1/2}$. A pair of peaks at around 712.6 eV and 721.1 eV are detected in the Fe spectrum, as depicted in FIG. 4D, which belong to Fe $2p_{3/2}$ and $2p_{1/2}$, respectively. FIG. 4E depicts two peaks for the O 1s at 529.9 eV and 531.5 eV, which can be attributed to the bulk lattice oxygen bound to metal (M) as (M-O, M-O-M). Further, FIG. 4F depicts the Cu 2p spectrum with two peaks located at binding energies of 933.7 eV, 943 eV for Cu $2p_{3/2}$, and one peak at 953.7 eV for Cu $2p_{1/2}$.

Figure 5A:
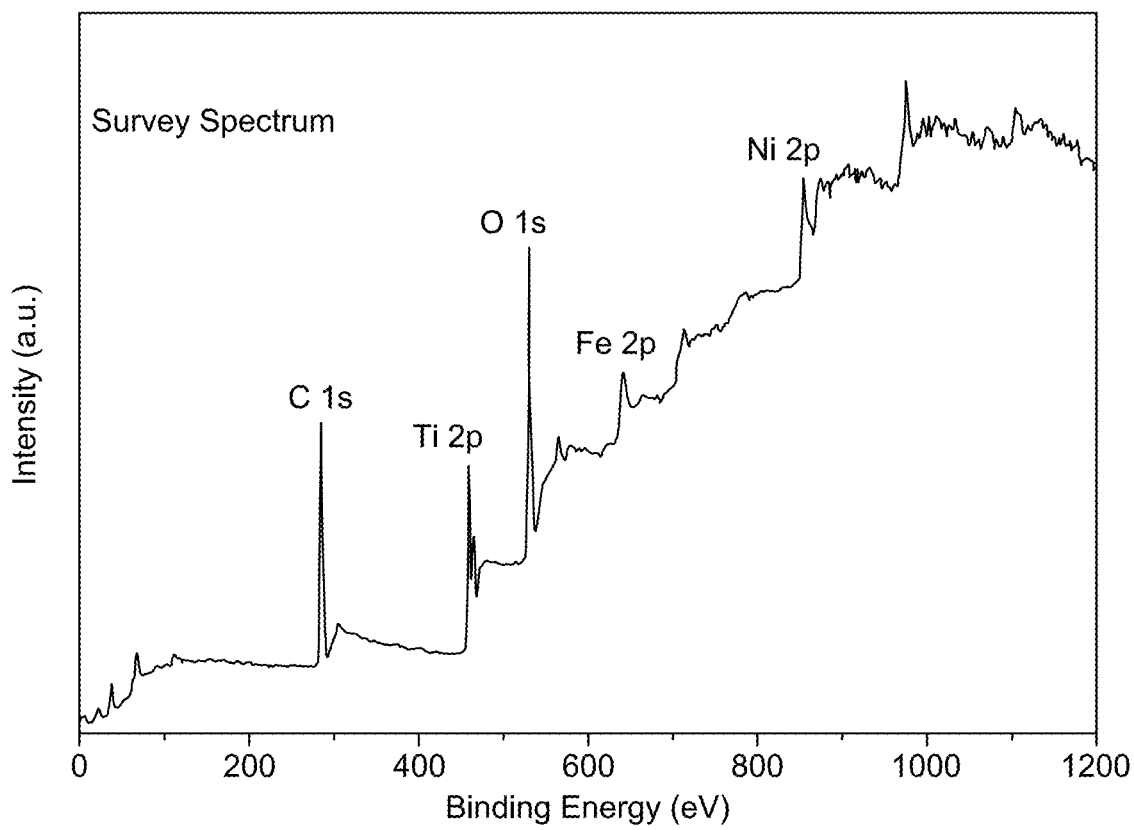
FIG. 5A shows an XPS survey spectrum of the C—TiO$_2$@NFF electrode, according to certain embodiments.
Figure 5B:
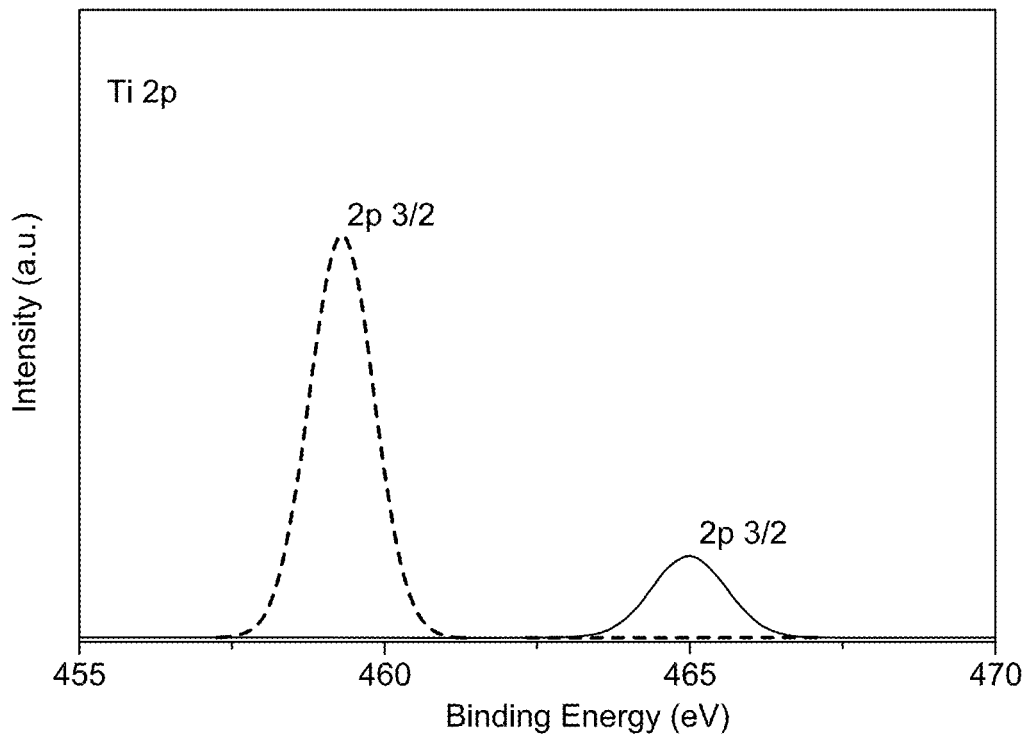
FIG. 5B shows an XPS graph for Ti 2p of the C—TiO$_2$@NFF electrode, according to certain embodiments.
Figure 5C:
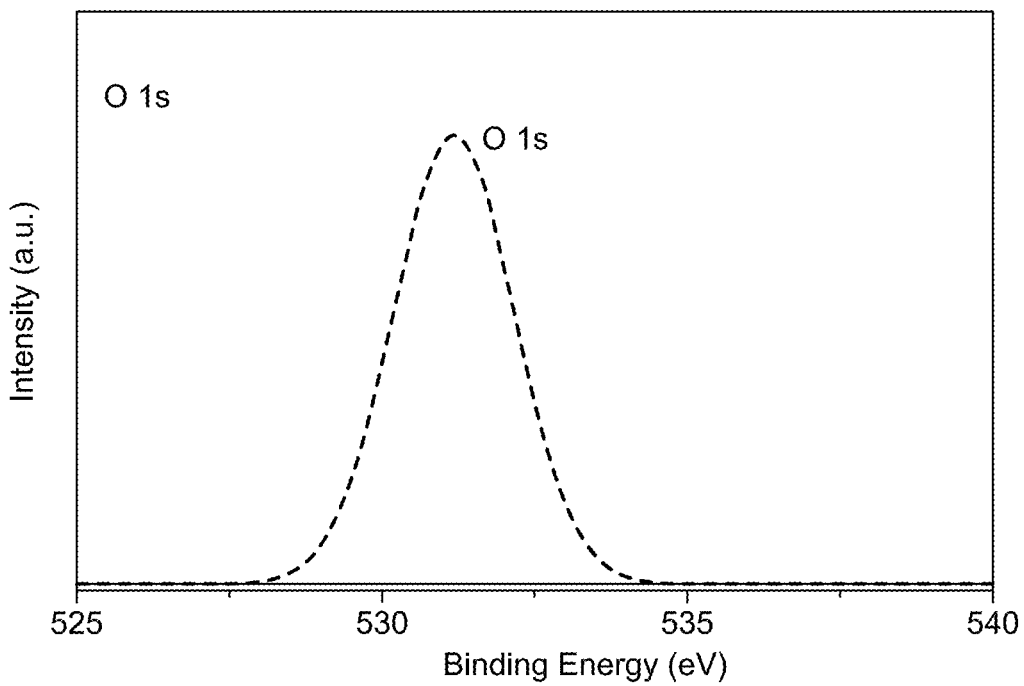
FIG. 5C shows an XPS graph for O 1 s of the C—TiO$_2$@NFF electrode, according to certain embodiments.
Figure 5D:
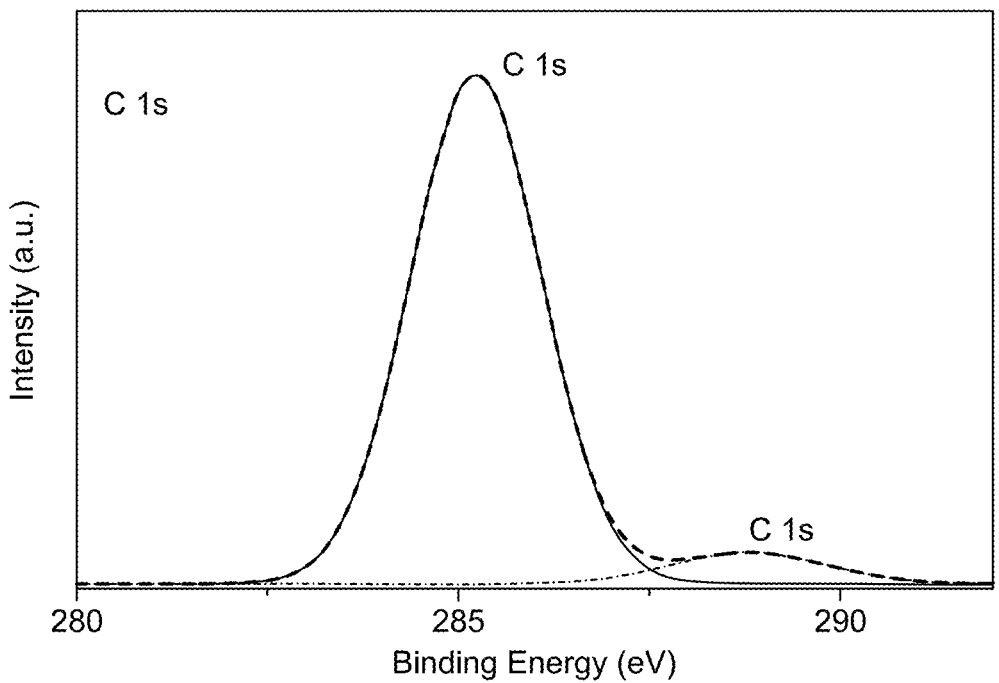
FIG. 5D shows an XPS graph for C 1 s of the C—TiO$_2$@NFF electrode, according to certain embodiments.
Figure 5E:
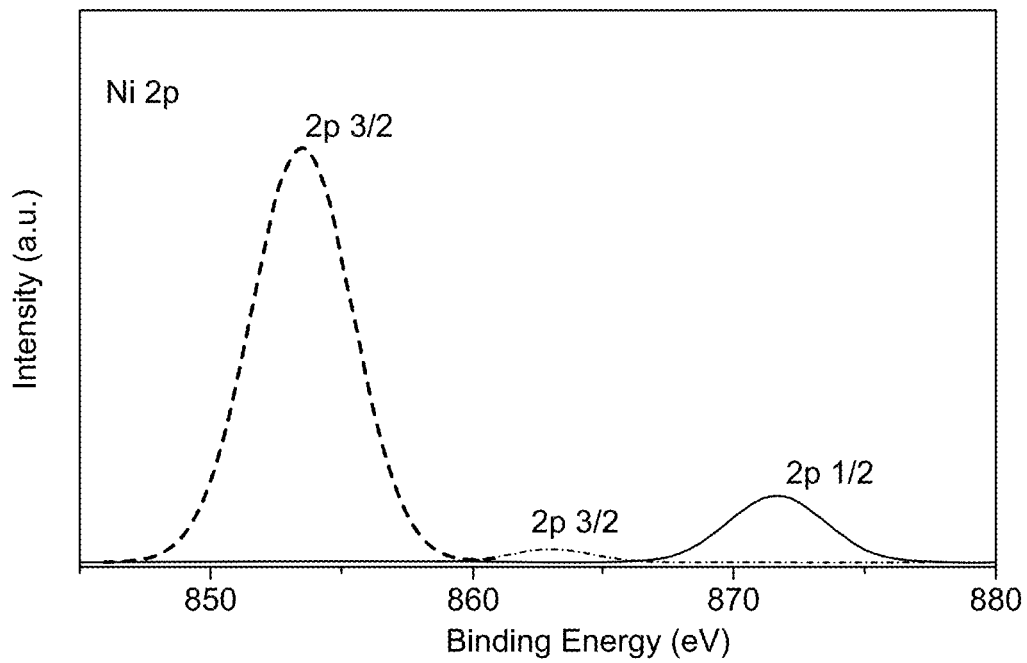
FIG. 5E shows an XPS graph for Ni 2p of the C—TiO$_2$@NFF electrode, according to certain embodiments.
Figure 5F:
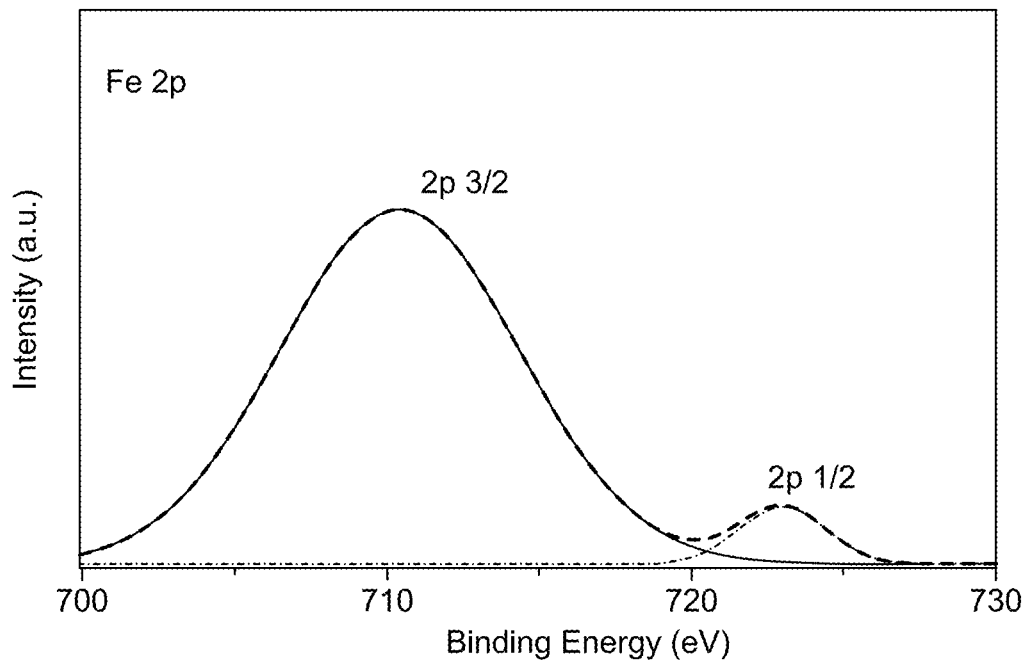
FIG. 5F shows an XPS graph for Fe 2p of the C—TiO$_2$@NFF electrode, according to certain embodiments.

In agreement with EDS measurements, the presence of Ti, O, C, Ni, and Fe has been revealed by the XPS survey spectrum of C—$TiO_2$@NFF, as depicted in FIG. 5A. The Ti 2p spectrum, as depicted in FIG. 5B shows two well-resolved spin peaks of Ti 2p at 464.9 eV and 459.3 eV that are assigned to Ti $2p_{3/2}$. FIG. 5C depicts one intense peak for the O 1s at 531.2 eV, attributed to the bulk lattice oxygen bound to Ti (Ti—O, Ti—O—Ti). The C 1s XPS spectrum may be deconvoluted into two peaks centered at 285.2 eV and 288.9 eV, which correspond to the carbon of C—C and O—C=O, respectively (FIG. 5D). This reveals the existence of C in $TiO_2$. The Ni 2p spectrum, as depicted in FIG. 5E shows three well-resolved spin peaks at 853.4 eV and 863.0 eV for Ni $2p_{3/2}$ and 871.7 eV for Ni $2p_{1/2}$. The Fe 2p spectrum with two peaks located at binding energies of 723.5 eV for Fe $2p_{1/2}$ and 710.4 eV for Fe $2p_{3/2}$ is depicted in FIG. 5F. The atomic composition of C—$TiO_2$@NFF indicated by XPS results was 29.78%, 54.05%, 8.45%, 6.01%, and 1.71% for Ti, O, C, Ni, and Fe, respectively.

Based on the fact that an X-ray-based probe for XPS gives the chemical composition at the surface region, whereas an electron-base probe for EDS denotes the concentration of elements present at the near-bulk property. Consequently, the results attained from XPS and EDS confirmed the successful homogeneity of the fabrication process and the unformal elemental distribution on the surface and the bulk of both electrodes (Fe—Co—Ni @CF and C—$TiO_2$@NFF).

Example 6: Electrochemical Measurements

Figure 6A:
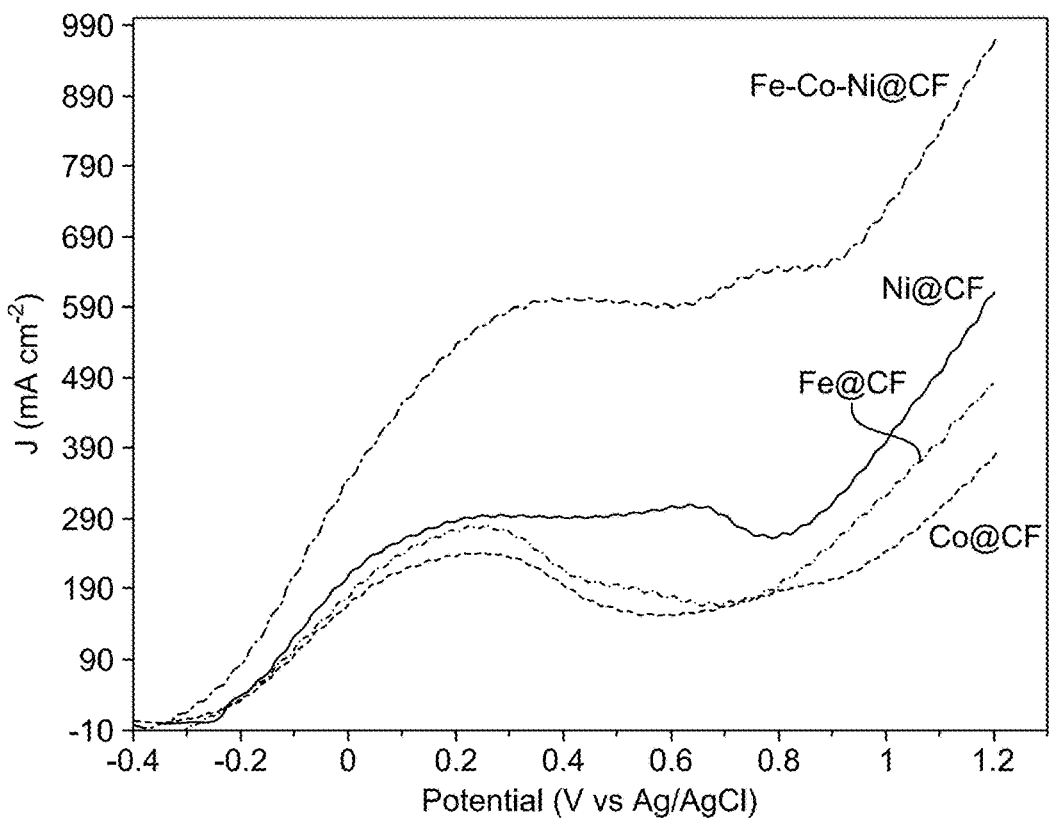
FIG. 6A shows a graph of current density (J) versus the external applied potential (V vs. Ag/AgCl) for Fe@CF (iron oxide on the CF substrate), Co@CF (cobalt oxide on the CF substrate), Ni@CF (nickel oxide on the CF substrate), and Fe—Co—Ni@CF, each as anode for oxygen evolution reaction (OER) and platinum (Pt) as cathode for hydrogen evolution reaction (HER) in each electrochemical cell, according to certain embodiments.

FIG. 6A depicts the current density versus the external applied potential (V vs. Ag/AgCl) curves for Ni-oxide (Ni@CF), Co-oxide (Co@CF), Fe-oxide (Fe@CF), and their ternary mixed oxide Fe—Co—Ni (Fe—Co—Ni@CF), during OER. It is evident from the FIG. 6A that the mixed Fe—Co—Ni on Cu foam has the highest electrocatalytic activity toward OER during water splitting to oxygen and hydrogen. At an applied voltage of 0.6 V vs. Ag/AgCl, the observed current density of 590.0 milliamperes per square centimeter (mA cm$^{-2}$) at mixed Fe—Co—Ni@CF is much higher compared to the observed current density of 178.0, 153.0, and 305.0 mA cm$^{-2}$ on Fe@CF, Co@CF, and Ni@CF individual oxides, respectively. At 1.2 V vs. Ag/AgCl, current densities of 380.0, 610.0, 479.0, and mA cm$^{-2}$, which were observed for Fe@CF, Co@CF, Ni@CF, respectively, have been drastically increased to 965 mA cm$^{-2}$ for Fe—Co—Ni@CF. The observed sharp rise in the current density for OER at Fe—Co—Ni@CF compared to those at the individual oxides of Ni@CF, Co@CF, and Fe@CF can be attributed to the fact that the presence of Fe along with Co and Ni generates active mixed oxide surfaces having lower overpotential for OER.

Figure 6B:
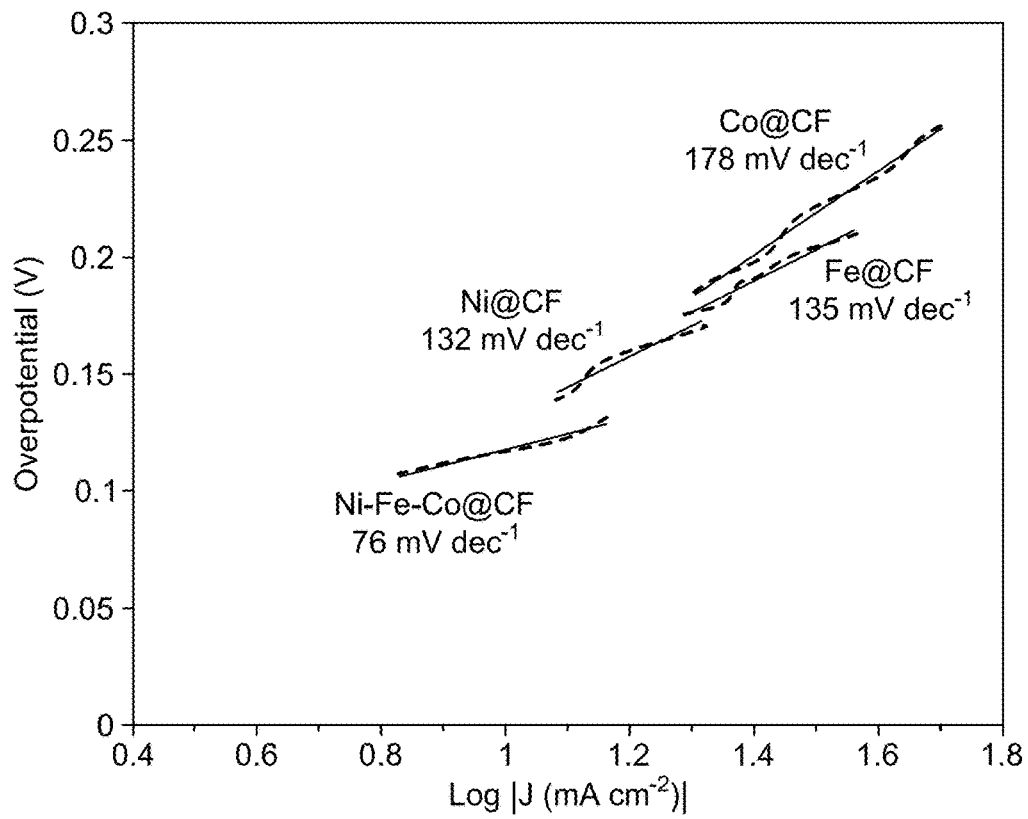
FIG. 6B shows a graph of the Tafel slopes of the Ni@CF, Fe@CF, Co@CF and Fe—Co—Ni@CF electrodes extracted from FIG. 6A, according to certain embodiments.

The Tafel plots derived from LSV curves are depicted in FIG. 6B. The corresponding Tafel slopes of Ni@CF, Fe@CF, Co@CF, and Fe—Co—Ni@CF were found to be 132, 135, 178, and 76 mV dec$^{-1}$, respectively. It can be seen that Fe—Co—Ni@CF has the lowest Tafel slope at 76 mV dec$^{-1}$, indicating favorable OER kinetics, which agrees with the result of LSV curves as depicted in FIG. 6A.

Figure 7A:
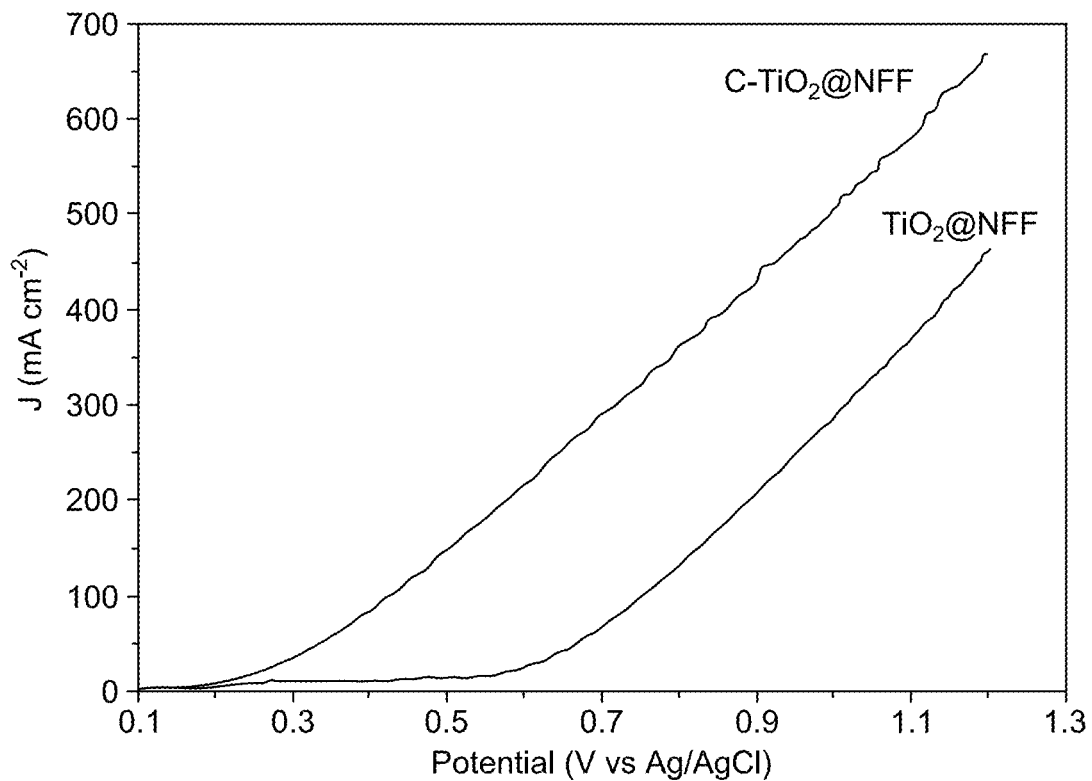
FIG. 7A shows a graph of J versus V vs. Ag/AgCl for working C—TiO$_2$@NFF (anode) vs counter platinum (Pt) (cathode) and working TiO$_2$@NFF (anode) vs. counter Pt (cathode) during water splitting reaction, according to certain embodiments.

FIG. 7A depicts the current density versus the external applied potential curves for C—$TiO_2$@NFF and $TiO_2$@NFF during HER. It is noted that C—$TiO_2$@NFF shows much higher HER activity than $TiO_2$@NFF. The required potentials to reach 50 mA cm$^{-2}$ and 100 mA cm$^{-2}$ for C—$TiO_2$@NFF are 335 mV and 425 mV, respectively. To attain the same current densities, $TiO_2$@NFF required higher potentials of 667 mV and 754 mV, respectively. An increase of current density from 463 mA cm$^{-2}$ for $TiO_2$@NFF to 668 mA cm$^{-2}$ for C—$TiO_2$@NFF was obtained at 1.2 V vs. Ag/AgCl. These noteworthy higher current densities of C—$TiO_2$@NFF compared to the corresponding $TiO_2$@NFF are attributed to the carbonaceous species on C—$TiO_2$@NFF, which have been confirmed by EDS and XPS analysis, which facilitate the charge transferability process from the bulk to the surface region through increasing its conductivity and maintaining its long-term stability in terms of overall water splitting. The substitutional carbon can create a deep impurity level within the forbidden band that lies immediately above the valence band, which allows most charge carriers to migrate from the bulk to the surface region successfully and prevents surface recombination, resulting in higher catalytic activities.

Figure 7B:
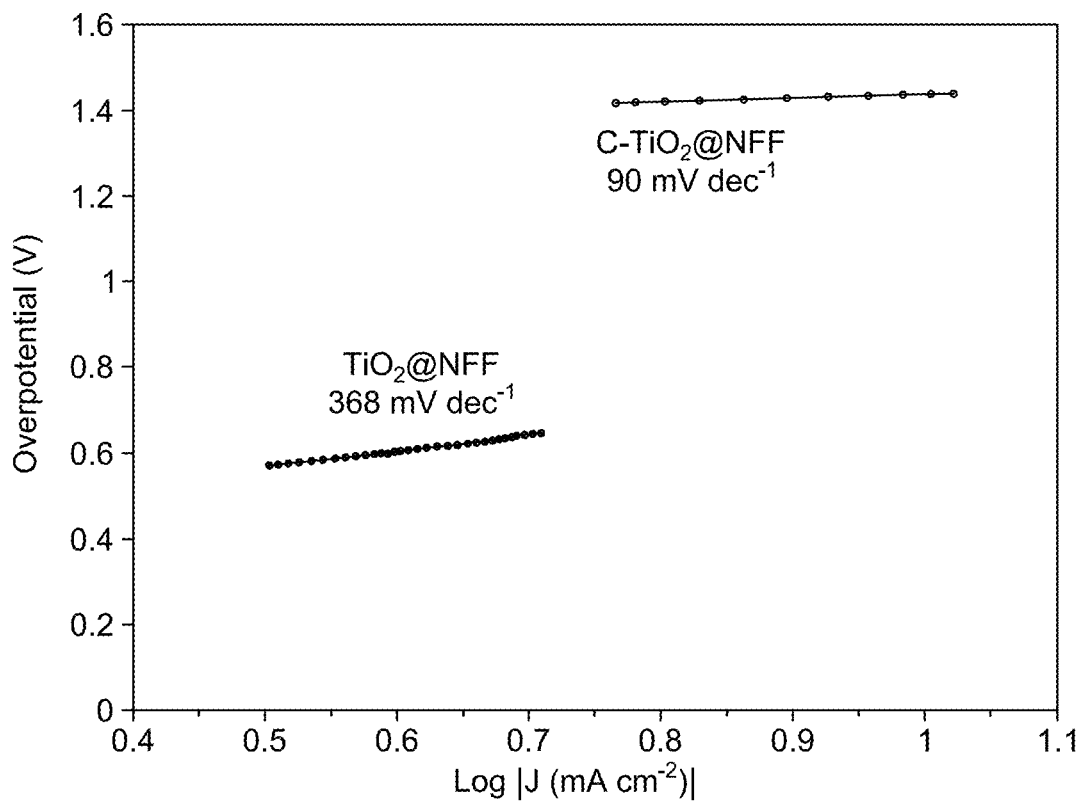
FIG. 7B shows Tafel slopes of the C—TiO$_2$@NFF (anode) vs counter platinum (Pt) (cathode) electrode and working TiO$_2$@NFF (anode) vs. counter Pt (cathode) electrode extracted from FIG. 7A, according to certain embodiments.

The Tafel behaviors for these catalysts were further studied to reveal the electrochemical kinetics and reaction mechanism for HER. As can be seen from FIG. 7B, the C—$TiO_2$@NFF shows much lower Tafel slope at 90 mV dec$^{-1}$, compared with $TiO_2$@NFF at 368 mV dec$^{-1}$. According to Butler-Volmer kinetics, the change in Tafel slopes indicates the transition between two reaction pathways, i.e., Volmer-Tafel and Volmer-Heyrovsky mechanisms. The Tafel slope revealed that, under the specified conditions, the HER catalyzed by C—TiO$_2$@NFF proceeded via the Volmer-Heyrovsky mechanism; that is, the electrochemical desorption of hydrogen was the rate-determining step. Also, the results in FIG. 7A indicates that the synergetic effect of carbon present on C—TiO$_2$ acts as a better electrocatalyst for OER than TiO$_2$ itself.

Figure 8A:
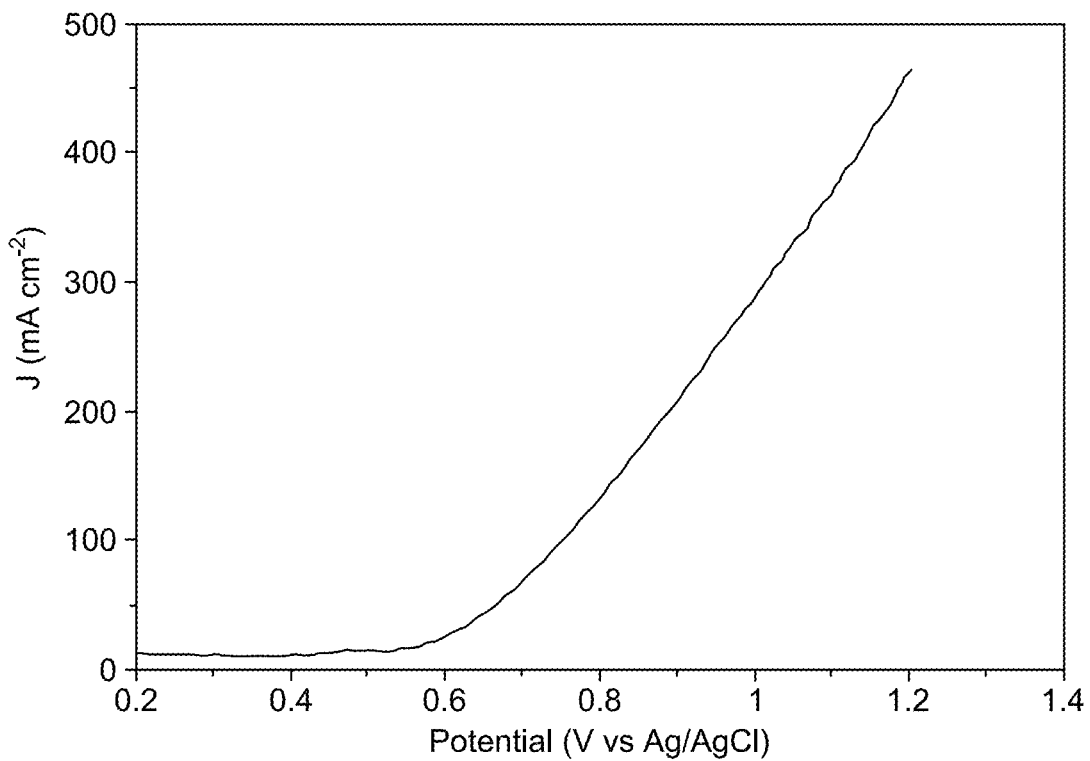
FIG. 8A shows a graph of J versus V vs. Ag/AgCl for the electrochemical cell having Fe—Co—Ni@CF (anode) for OER and C—TiO$_2$@NFF (cathode) for HER during overall water splitting measurement in 1.0 molar (M) potassium hydroxide (KOH) solution, according to certain embodiments.
Figure 8B:
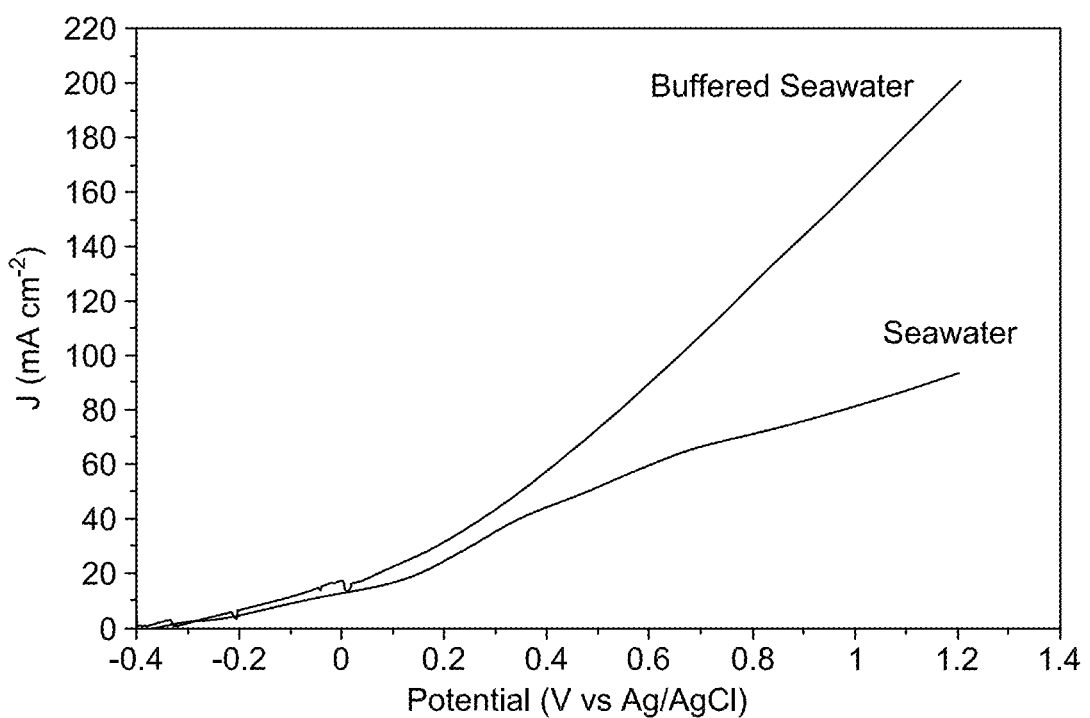
FIG. 8B shows a graph of J versus V vs. Ag/AgCl for the electrochemical cell having Fe—Co—Ni@CF (anode) for OER and C—TiO$_2$@NFF (cathode) for HER during overall water splitting measurement in seawater and buffered seawater, according to certain embodiments.

Considering the electrocatalytic performances of Fe—Co—Ni@CF toward OER and C—TiO$_2$@NFF toward HER, the overall water-splitting performance was followed up by assembling the C—TiO$_2$@NFF and Fe—Co—Ni@CF electrodes as catalysts for cathode and anode, respectively. Meanwhile, 1 M KOH, natural seawater, and buffered natural seawater were used as electrolyte solutions. FIG. 8A depicts the overall water splitting in 1 M KOH, which required potentials of 677 mV, 755 mV, and 891 mV (vs. Ag/AgCl) to reach the current densities of 50 mAcm$^{-2}$, 100 mAcm$^{-2}$, and 200 mAcm$^{-2}$, respectively. On the other hand, the overall water splitting in natural seawater and buffered natural seawater is shown in FIG. 8B. The required potentials to reach 50 mV and 80 mA cm$^{-2}$ in seawater were 484 mV and 975 mV (vs. Ag/AgCl), respectively. To obtain the same current densities in buffered seawater, lower potentials of 347 mV and 540 mV, respectively, are required. At 1.2 V, the current density has drastically increased from 93.3 mA cm$^{-2}$ for seawater to 200.8 mA cm$^{-2}$ for buffered seawater, revealing the high efficacy of the buffered solution for overcoming the challenges of seawater as an electrolyte for water splitting.

Because of seawater splitting, HER on the cathode faces some challenges as there are a large number of dissolved cations (Ca$^{2+}$, Mg$^{2+}$, etc.) and small particles in seawater, which may affect the performance of electrocatalyst. Notably, the pH of the solution will increase during seawater splitting, and the calcium hydroxide and other precipitates will be formed on the electrode surface and cover the active centers. Although carbonates in seawater can act as buffers, their capacity is insufficient to prevent the increase in pH at the cathode and the decrease in pH at the anode. Studies showed changes in pH near the electrode surface could be 5 to 9 pH units from that of the bulk seawater for a slightly buffered medium when its overall pH value is between 4 and 10, even at moderate current densities lesser than 10 mA cm$^{-2}$. Such dramatic pH fluctuations may cause catalyst degradation. Increasing pH near the cathode during seawater electrolysis can lead to precipitation of magnesium hydroxide (Mg(OH)$_2$), which occurs when pH is approximately greater than or equal to 9.5, blocking the cathode. Stabilization of pH fluctuations may require the addition of supporting electrolytes.

Another issue is the competition between the OER and chloride chemistry at the anode. Chloride electro-oxidation chemistry is complicated, and several reactions occur depending on the pH values and potentials applied. When the pH is below 3.0, the free chlorine evolution reaction (CER), as shown in equation 12, dominates over the other chloride oxidation reactions. Hypochlorous acid formation can also occur at lower pH but becomes the major reaction for pH 3 to 7.5. Hypochlorite formation occurs at pH values higher than 7.5, as shown in equation 13. At the two pH extremes, the two chloride oxidation reactions are:

Chlorine Evolution Reaction (CER):

$$2Cl^- \rightarrow Cl_2 + 2e^- \quad (pH=0) \tag{12}$$

Hypochlorite Formation:

$$Cl^- + 2OH^- \rightarrow ClO^- + H_2O + 2e^- \quad (pH=14) \tag{13}$$

It is worth noting that both reactions of chloride ion, as shown in equations 12 and 13, are two-electron reactions, unlike with the OER in which four electrons are involved. The CER, or the formation of hypochlorite, competes with the OER reaction. CER and hypochlorite formation are two-electron reactions in equations 12 and 13, which is more advantageous in kinetics than the four-electron reaction of OER. However, OER has more advantages in thermodynamics than hypochlorite formation when pH exceeds 7.5. Therefore, the addition of buffer media (borate buffer) did successfully overcome these challenges by maintaining the pH to around 8.5 to avoid the formation of precipitates as well as the evolution of corrosive and toxic chlorine gas during the electrolysis of seawater, which has been successfully proved by the invented seawater splitting system.

Numerous modifications and variations of the present disclosure are possible in light of the above teachings. It is therefore to be understood that within the scope of the appended claims, the invention may be practiced otherwise than as specifically described herein.

The invention claimed is:

1. A method of generating oxygen, comprising:
    applying a potential of from 0.1 to 2 V to an electrochemical cell,
    wherein the electrochemical cell is at least partially submerged in an aqueous solution,
    wherein on the applying the potential the aqueous solution is oxidized forming the oxygen,
    wherein the electrochemical cell comprises:
        a counter electrode; and
        an electrocatalyst,
    wherein the electrocatalyst comprises:
        a copper foam substrate; and
        a nanocomposite comprising:
            iron oxide;
            cobalt oxide; and
            nickel oxide,
    wherein particles of the nanocomposite are distributed on a surface of the copper foam substrate,
    wherein the particles of the nanocomposite have a spherical shape with an average diameter of less than 500 nm, and
    wherein the electrocatalyst comprises 0.1-1 at. % Fe, 0.1-2 at. % Co, 1-5 at. % Ni, 60-70 at. % Cu, and 25-35 at. % O, based on a total number of atoms in the electrocatalyst.

2. The method of claim 1, wherein the particles of the nanocomposite are aggregated forming aggregates with an average size of 500 nm to 5 μm.

3. The method of claim 1, wherein the copper foam has an average pore size of 500 nm to 1 μm.

4. The method of claim 1, wherein the particles of the nanocomposite form a continuous layer on the copper foam substrate.

5. The method of claim 1, wherein the electrocatalyst is made by a method, comprising:
    mixing an iron salt, a nickel salt, and a cobalt salt to form a mixture; and
    performing spray pyrolysis with the mixture onto the copper foam substrate,
    wherein the spray pyrolysis is performed 1-10 times for a period of 1-30 seconds each with an oxygen carrier gas.

6. The method of claim 5, wherein the copper foam substrate has a temperature of 300-500° C. during the spray pyrolysis.

7. The method of claim 5, wherein the mixture comprises a molar ratio of the iron salt to nickel salt to cobalt salt of 1-10 to 1-10 to 1-10.

8. The method of claim 1, wherein the counter electrode comprises:
- a nickel-iron foam substrate; and
- carbon doped titanium oxide,
- wherein particles of the carbon doped titanium oxide are distributed on a surface of the nickel-iron foam substrate, and
- wherein on the applying the potential the aqueous solution is reduced forming hydrogen.

9. The method of claim 8, wherein the particles of the carbon doped titanium oxide have a nanoflake shape.

10. The method of claim 8, wherein the counter electrode comprises 25-35 at. % Ti, 50-60 at. % O, 5-10 at. % C, 1-5 at. % Fe, and 1-10 at. % Ni, based on a total number of atoms in the counter electrode.

11. The method of claim 8, wherein in the particles of the carbon doped titanium oxide a portion of lattice oxygens are replaced with carbon and/or a portion of titanium atoms are replaced with carbon.

12. The method of claim 8, wherein the counter electrode has a Tafel slope of 85-95 mV/decade.

13. The method of claim 1, wherein the aqueous solution is seawater.

14. The method of claim 1, wherein the aqueous solution is buffered seawater.

15. The method of claim 1, wherein the electrocatalyst has a Tafel slope of 70-80 m V/decade.

16. The method of claim 8, wherein the electrochemical cell has an overpotential of 330-360 m V to reach 50 mA/cm$^2$.

17. The method of claim 8, wherein the electrochemical cell has at a current density of 190-210 mA/cm$^2$ at the potential of 1.2 V, and
wherein the aqueous solution is buffered seawater.

* * * * *